United States Patent [19]

Ben-Shachar

[11] Patent Number: 5,761,656
[45] Date of Patent: Jun. 2, 1998

[54] INTERACTION BETWEEN DATABASES AND GRAPHICAL USER INTERFACES

[75] Inventor: Ofer Ben-Shachar, Palo Alto, Calif.

[73] Assignee: NetDynamics, Inc., Menlo Park, Calif.

[21] Appl. No.: 494,753

[22] Filed: Jun. 26, 1995

[51] Int. Cl.$^6$ .................................................. G06F 17/30
[52] U.S. Cl. ........................ 707/4; 345/335; 345/968; 395/680
[58] Field of Search .................... 395/604, 326, 395/334, 339, 348, 680–684; 345/335, 348, 356, 357, 968; 707/4, 103

[56] References Cited

U.S. PATENT DOCUMENTS

| | | | |
|---|---|---|---|
| 5,442,779 | 8/1995 | Barber et al. | 395/604 |
| 5,506,952 | 4/1996 | Choy et al. | 395/348 |
| 5,551,030 | 8/1996 | Linden et al. | 395/613 |
| 5,553,218 | 9/1996 | Li et al. | 395/613 |
| 5,579,471 | 11/1996 | Barber et al. | 395/326 |
| 5,590,322 | 12/1996 | Harding et al. | 395/604 |
| 5,598,524 | 1/1997 | Johnston, Jr. et al. | 395/348 |
| 5,606,691 | 2/1997 | Watts et al. | 395/604 |
| 5,617,114 | 4/1997 | Bier et al. | 345/113 |
| 5,619,688 | 4/1997 | Bosworth et al. | 395/604 |
| 5,627,979 | 5/1997 | Chang et al. | 395/335 |
| 5,668,966 | 9/1997 | Ono et al. | 345/356 |

OTHER PUBLICATIONS

Graham, Ian S., "The HTML Sourcebook", (John Wiley & Sons, Inc., New York, 1995), pp. 210–215.

Ng, Jason, "New Mosaic–SQL Interface", Internet document dated Dec. 1993 (www.ncsa.uiuc.e . . . b/gsql/sample-form.html), 2 pages.

Ng, Jason, "GSQL in Detail", Internet document dated Dec. 1993 (www.ncsa.uiuc.e . . . on/pub/gsql/howto.html), 4 pages.

Ng, Jason, "GSQL PROC File Commands", Internet document dated Dec. 1993 (www.ncsa.uiuc.e . . . pub/gsql/proc-fmt.html), 8 pages.

Ng, Jason, "GSQL—a Mosaic–SQL Gateway", Internet document dated Dec. 1993 (www.ncsa.uiuc.e . . . ub/gsql/starthere.html), 2 pages.

Ng, Jason, "GSQL—A Mosaic–SQL Gateway", Internet document dated Dec. 1993, 12 pages.

Letovsky, Stanley, "About Web/Genera", Internet document copyright dated 1994, 29 pages.

Rasmussen, Bo Frese, "A Web to Database Interface", Internet document dated May 17, 1995, 21 pages.

Hatfield, Developing PowerBuilder™ 4 Applications, 3rd ed. (SAMS Publishing, Indianapolis, Indiana, 1995).

"GSQL—A Mosaic–SQL Gateway", Jason Ng, (12 pages). No date.

"About Web/Genera", Stanley Letovsky, (29 pages). No dae.

"A Web to Database Interface", Bo Frese Rasmussen, (21 pages). No date.

*The HTML Sourcebook*, Ian S. Graham, 1995, pp. 269–277.

*Primary Examiner*—Thomas G. Black
*Assistant Examiner*—M. N. Von Buhr
*Attorney, Agent, or Firm*—Skjerven, Morrill, MacPherson, Franklin & Friel; Michael Shenker

[57] ABSTRACT

To provide an interface between a computer application and a database, a user invokes the application and another program, called "link manager". The user "drags and drops" GUI objects from the application window to the link manager window to command the link manager to associate parameters of the GUI objects (e.g., object names) with input and output fields of database operations. The link manager records these associations in a mapping file. When later the application is executed, a program, called "execution manager", reads the mapping file. When the application issues a request to the database, the execution manager uses the mapping file to translate the request to the database format, converting values of parameters of GUI objects to input values of a database operation as defined by the mapping file. The execution manager translates the database response to the application format, converting output values of the response to values of application GUI parameters as defined by the mapping file.

65 Claims, 17 Drawing Sheets

Microfiche Appendix Included
(7 Microfiche, 662 Pages)

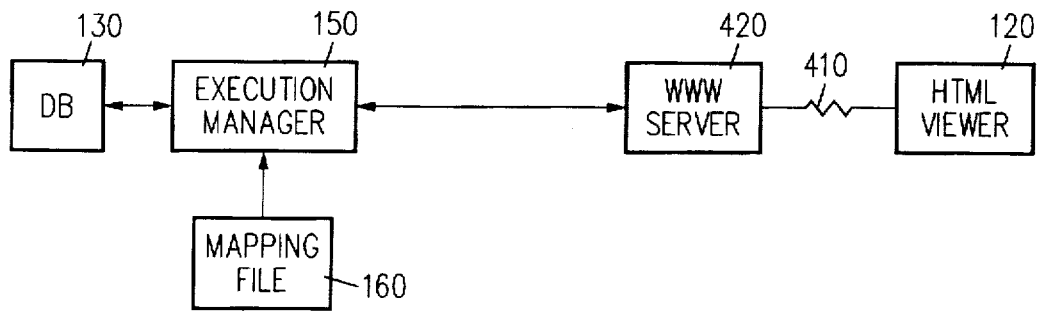

FIG. 4

510  User invokes application. User commands application to display application window.

520  User invokes link manager. User commands link manager to display link manager window.

524  User commands link manager to invoke database viewer which displays database viewer window.

530  User commands database viewer to display database tables and/or stored procedures in database viewer window.

534  User selects database tables and/or stored procedures in database viewer window.

536  User commands database viewer to transfer parameters of selected database tables and/or stored procedures to link manager to be displayed in link manager window. Using these parameters, the user builds in link manager window a representation of a database operation (such as a stored procedure or a query). To connect the DB operation to the application, user "drags & drops" fields from the application window to input and output fields of DB operation in the link manager window. Link manager associates the "dragged & dropped" fields of the application window with DB operation input and output fields. Link manager creates mapping file.

FIG. 5

The selected database is: stores6@learn_online

Using: Database Tables  —166.2

With one or more of the following tables:

```
call_type
catalog
cust_calls
customer
custview
items
log_record
manufact
```

[ Ok ]                    [ Close ] [ Help ]

FIG. 8

```
                                    ┌─164-A
                    Output Field Association   Prev   Next
     Associate Database Field: customer.lname ──910.1.1
     with length of  |15            characters
                        \910.1.3
     with HTML   field ┘  | name                    |
                                             \
                                              910.1.2       ├910.1 reposition customer.lname after     none  ┘

| Modify | Delete | Clear |           Close  Help

Output Field Association   Prev   Next
     Associate Database Field: customer.phone ──910.2.1
     with length of  |18            characters
                        \910.2.3
     with HTML   field ┘  | phone                   |
                                             \
                                              910.2.2       ├910.2 reposition customer.phone after    customer.lname ┘

| Modify | Delete | Clear |           Close  Help
```

FIG. 9

Available database columns for output into HTML form:

catalog Table: catalog_num (serial:4) | stock_num (smallint:4) | manu_code (char:3) | cat_descr (text:blob)
cat_picture (byte:blob) | cat_advert (varchar:65536)    ← 164.6 manufact Table: manu_code (char:3) | manu_name (char:15) | lead_time (Interval:8)

stock Table: stock_num (smallint:4) | manu_code (char:3) | description (char:15) | unit_price (money:8)
unit (char:4) | unit_descr (char:15)

Arrange database output into: predefined HTML template

Use predefined HTML template...  /opt/www/doc/NetBase/html/catalog.html

Insert HTML header file...  /opt/www/doc/NetBase/html/cat_prefix.html

Output Fields list    ← 164.8 catalog.catalog_num... | catalog.stock_num... | catalog.cat_advert... | stock.description... | stock.unit_price... | stock.unit...
stock.unit_descr... | catalog.cat_picture... | catalog.cat_descr... | manufact.manu_code... | manufact.manu_name...

Append HTML footer file...  /opt/www/doc/NetBase/html/cat_suffix.html

FIG. 19B

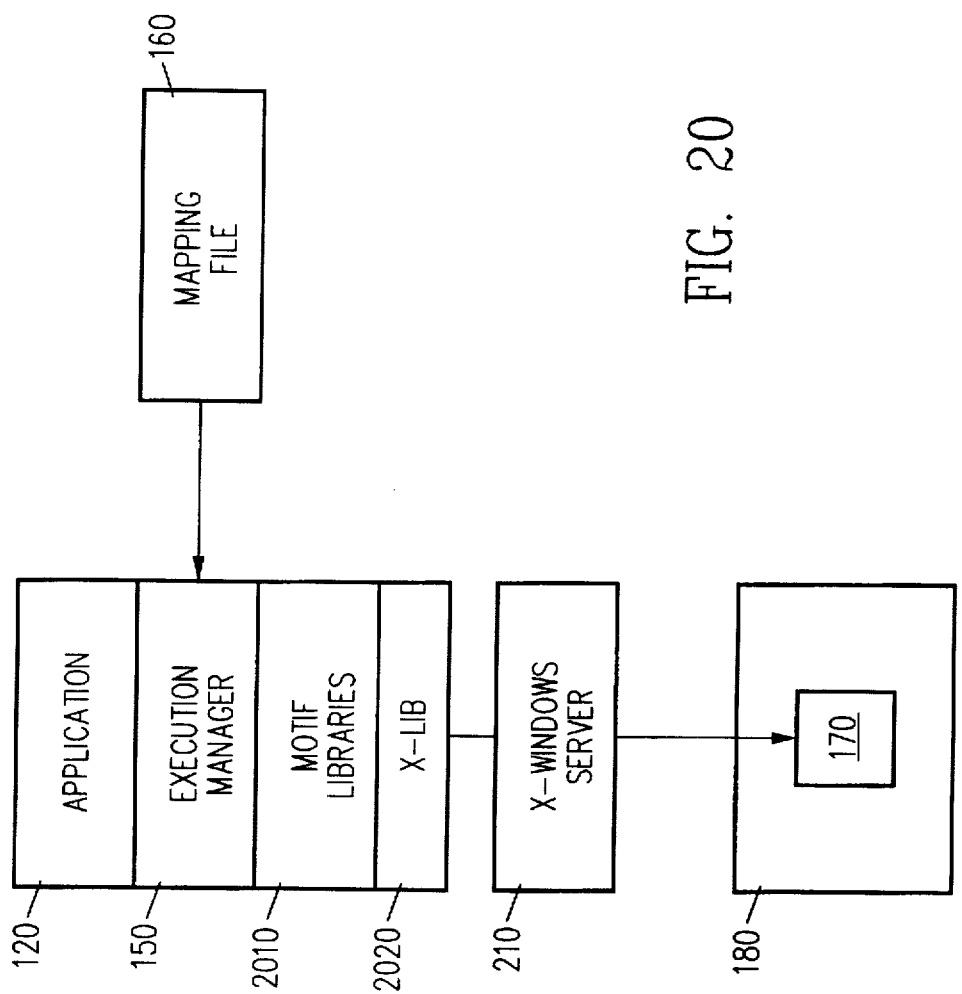

INTERACTION BETWEEN DATABASES AND GRAPHICAL USER INTERFACES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This patent document has a microfiche appendix containing 7 sheets of microfiche. The total number of frames in the microfiche appendix is 662. The microfiche appendix is a listing of computer programs and related data for one embodiment of the link and execution managers of this invention, which is described below.

BACKGROUND OF THE INVENTION

The present invention relates to computer interface, and more particularly to an interface between databases and computer programs that use graphical user interface (GUI) to interact with a user, and also between a program that uses a GUI and another program.

A GUI makes computer programs easier to use. Consider, for example, a program that imitates an address book by allowing the user to store and retrieve addresses and phone numbers. A GUI can make such a program as easy to use as a conventional address book. In particular, a GUI can be used to display distinctly-shaped, easy-to-see fields for addresses and phone numbers. The user can type in the addresses and phone numbers as easily as writing them in an address book. A mouse click on a visual pushbutton causes the program to save the address and the phone number in a database. Retrieving information can be made equally easy, and does not require cryptic commands characteristic of early computer applications.

Computer programs using a GUI will be called herein computer applications, or sometimes simply applications.

To facilitate development and maintenance of computer applications, it is desirable to modularize the applications so that different modules can be developed and maintained separately. To this end, the database portion of an application is sometimes taken out of the application and developed as a separate module. The database developers define a database interface. The application issues requests to the database in accordance with a format defined by the database interface. The application receives the database responses in the database format and converts them to other formats as needed.

To further facilitate application development and maintenance, computer tools have been provided to create graphical user interfaces. One such tool is PowerBuilder® described in Bill Hatfield, "Developing PowerBuilder 4 Applications" (3rd Edition, 1995) and illustrated in Figs. 1A, 1B. FIG. 1A illustrates the application building stage. The PowerBuilder application building tools 104 (FIG. 1A) help the user to build application portion 120A which defines an application GUI. Application portion 120A includes the application "p-code". The p-code cannot be executed by a computer. To execute the application on a computer, the portion 120A is combined with PowerBuilder runtime 120B (FIG. 1B) which interprets the p-code and performs the actions specified by the p-code, such as displaying GUI objects and interacting with database 130.

It is desirable to further modularize computer applications and to facilitate interaction between applications and databases.

SUMMARY

The present invention allows further modularization of computer applications by separating a portion that handles the application/database interface. Developing the application/database interface as a separate portion also allows creation of an interface independent of tools used to build the application.

More particularly, as illustrated in FIGS. 1A, 1B, the PowerBuilder runtime 120B provides an application/database interface for applications built with PowerBuilder tools 104. However, PowerBuilder runtime 120B will not necessarily provide an application/database interface for an application built with other types of tools even if that application uses the same displays and user input commands and provides the same functionality. Indeed, applications built with other tools may include no p-code. Thus, a different application/database interface has to be provided for such applications.

The present invention provides an application/database interface for applications built with any tools, or without any tools, as long as the applications use predefined interface rules for requests that they generate for databases and for responses that they accept in response to the requests. The interface rules include request/response formats and/or application programming interface (API) for obtaining requests and request fields and for providing responses and response fields.

In some embodiments, the application/database system interface of the present invention is easy to modify to accommodate new interface rules.

These advantages are provided in some embodiments as follows. A computer program called herein a link manager interacts with the application and the database to create mapping data that define a mapping between (1) parameters of the application GUI and (2) input or output fields of database operations (such as insert, update, and delete operations, queries, and stored procedures). The link manager saves the mapping data in a mapping file. At the execution stage, a program called an execution manager reads the mapping file created by the link manager and translates data between the database and the application as specified by the mapping file.

In performing these operations, the link and execution managers use predefined interface rules to process requests generated by the application and to generate responses to the application. However, in some embodiments the link and execution managers do not build the application. While PowerBuilder tools 104 build an application portion and thus help define the application GUI, the link manager does not define the application GUI but rather receives GUI parameters from an already built application. Thus, the same link manager and the same execution manager can provide an application/database interface for any application that uses the same interface rules to interact with a database. For example, in some embodiments, the same link manager and the same execution manager can provide an application/database interface for any HTML (Hypertext Markup Language) application, or for any Motif application.

In some embodiments, the mapping file is created as follows. The user invokes the link manager. Using the link manager's own GUI, the user causes the link manager to display, in the link manager window, a database request in the database format. In particular, the link manager displays the input fields of the database request. The user invokes the application and causes the application to display GUI objects in an application window. The user uses a mouse to drag an object from the application window to the corresponding input field of the database request in the link manager window. The link manager traces the mouse movement and maps a parameter of the object (for example, the object name or the object attribute name) to the input field. At the execution stage, the execution manager will insert in the database input field a value of the parameter (for example, the object value or the object attribute value).

At the link manager stage, in order to map a database response from the database format to the application format, the user causes the link manager to display the names of the output data fields of the database operation. For each output data field of the response, the link manager also displays an empty text field into which the user drags and drops a GUI object from the application window. The link manager creates a mapping between (1) a parameter of the GUI object and (2) the data field of the response. At the execution stage, when the database returns a response, the execution manager will provide to the application the values of the data fields in the response as values of the corresponding parameters of the application GUI objects.

In some embodiments, the mapping file uses self-describing object fields ("SD object fields", or "SDO fields", or "self-describing fields", or "SD fields") to provide common data representation for the application and the database. A self-describing field defines a format for a computer value. Examples of computer value formats are a string of length 512 bytes (or some other length), or an integer of length 4 bytes. At the execution stage, a mapper translates data between the application and self-describing fields. A mapper is an object created by the execution manager. A mapper includes computer instructions and, possibly, data in the mapping file. Another mapper translates data between self-describing fields and the database. Thus, in order to enable the link manager and the execution manager to work with a new application that uses different interface rules for interacting with a database, it is sufficient to provide a new mapper that can translate data between the new application and the self-describing fields. The link manager may have to be modified to generate mapping data for the new mapper, and the execution manager may have to be modified by inclusion of computer instructions for the new mapper. Similarly, an interface to a new database can be provided simply by providing a new mapper between the new database formats and self-describing fields. Thus, SD fields facilitate development of new application/database interfaces.

Other features and advantages of the invention are described below. The invention is defined by the appended claims.

BRIEF DESCRIPTION OF THE DRAWINGS

FIG. 4 is a block diagram illustrating an embodiment of FIG. 2B.

FIG. 5 is a process flow diagram of the stage of FIG. 2A.

FIGS. 6–9 illustrate graphical user interface windows at the stage of FIG. 2A.

Figure 17:
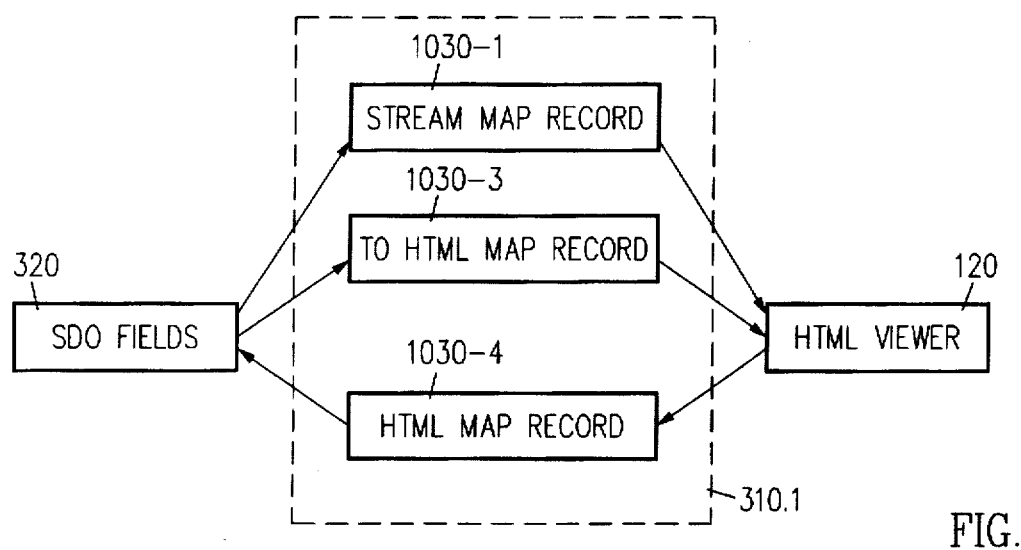
Figure 18:
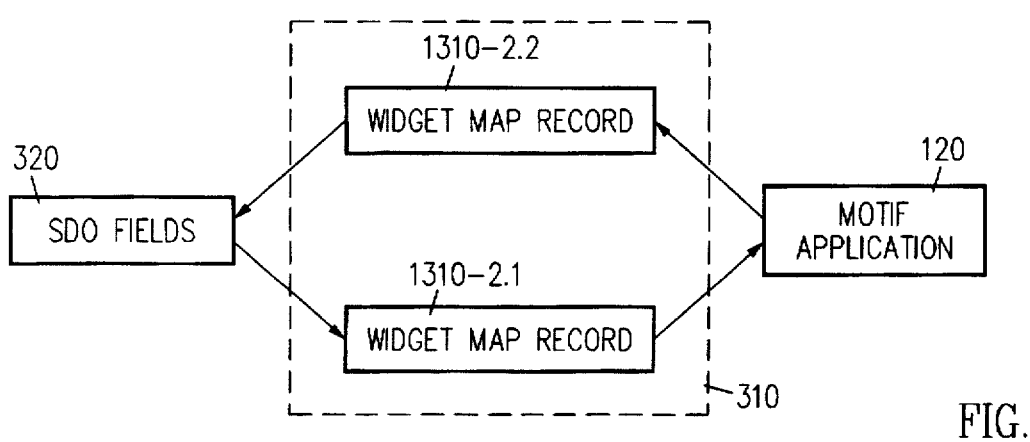

Each of FIGS. 17 and 18 is a block diagram illustrating a relationship between an application and a mapping file.

Figure 1A:
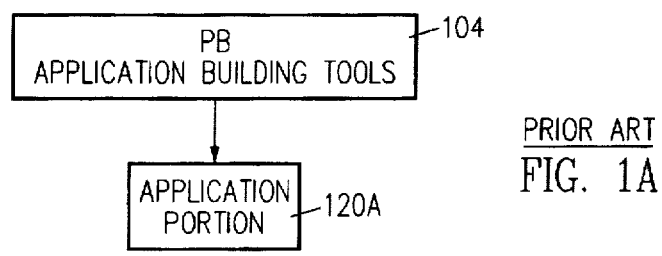
FIG. 1A is a block diagram of a prior art application building process.
Figure 1B:
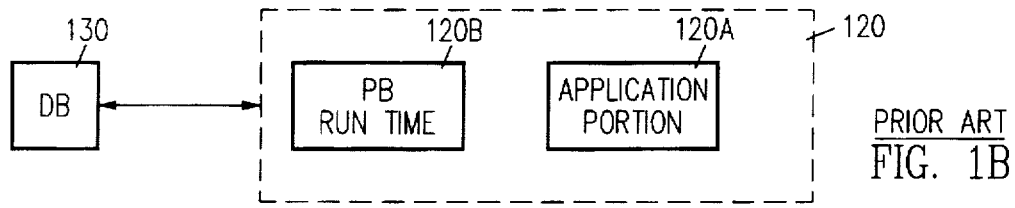
FIG. 1B is a block diagram of a prior art application execution system.
Figure 2A:
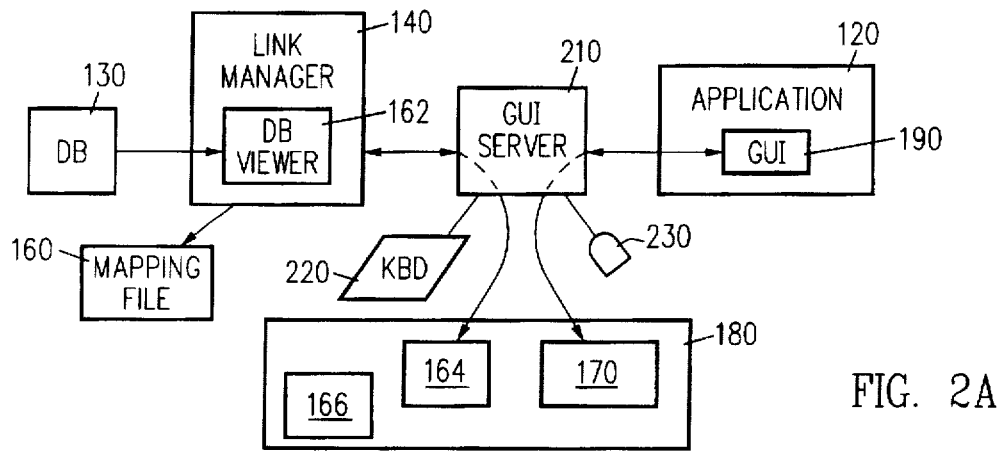
FIG. 2A is a block diagram of a system according to the present invention at the stage at which the link manager creates a mapping file to map data between an application and a database.
Figure 19A:
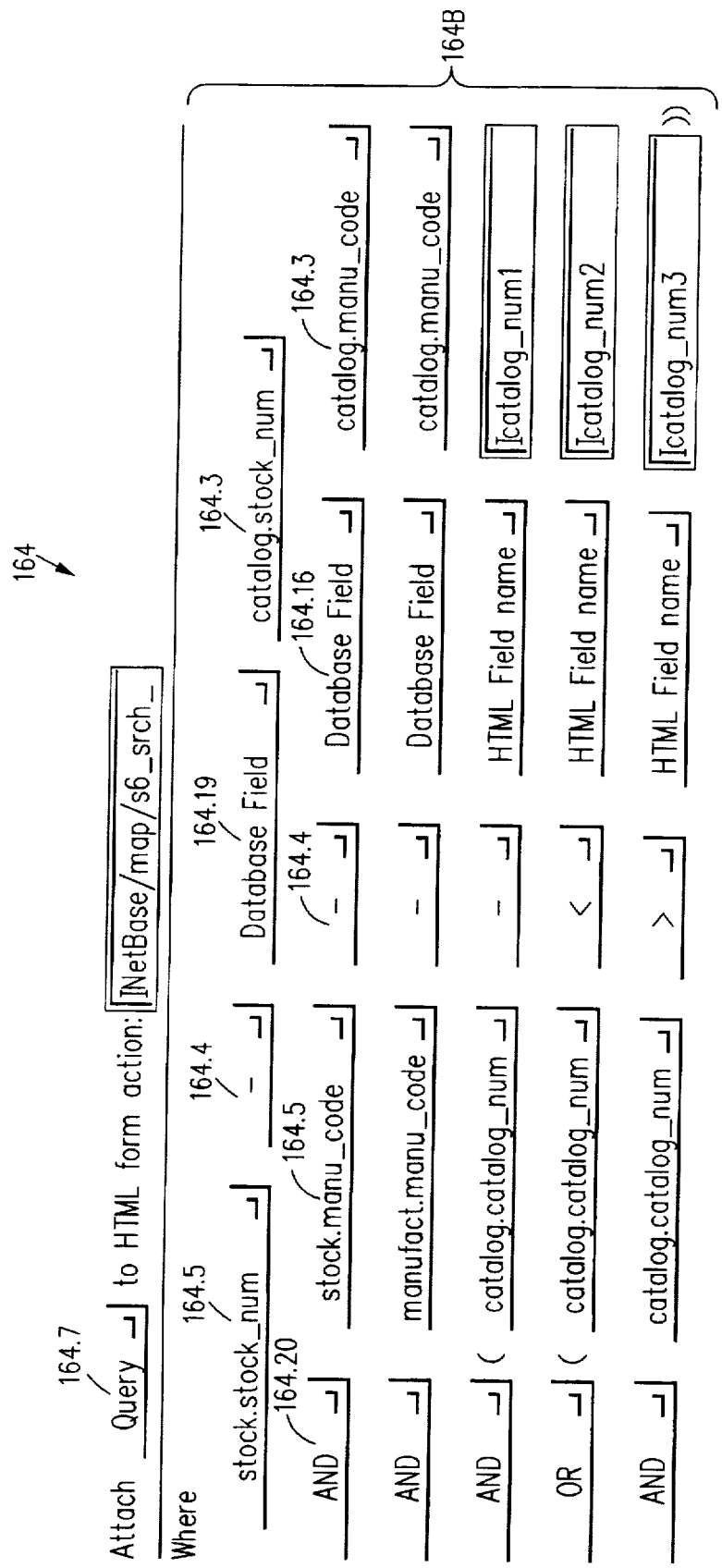

FIGS. 19A, 19B illustrate a link manager window at the stage of FIG. 2A.

Figure 2B:
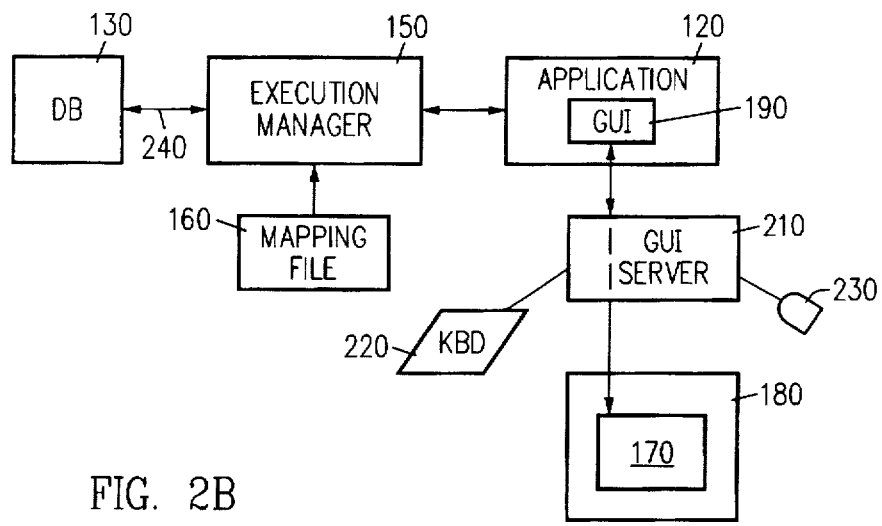
FIG. 2B is a block diagram of a system according to the present invention at the stage of the application execution.

FIG. 20 is a block diagram of an embodiment of FIG. 2B.

DESCRIPTION OF THE PREFERRED EMBODIMENTS

FIGS. 2A and 2B illustrate an interface between application 120 and database 130. Application 120, database (DB) 130, link manager 140 (FIG. 2A) and execution manager 150 (FIG. 2B) are computer programs each of which is executed by one or more computers.

Database 130 includes data and a data base management system. At the stage illustrated in FIG. 2A, link manager 140 creates mapping file 160. Mapping file 160 is stored in a computer storage including one or more disks, random access memory, and/or other computer devices. Mapping file 160 defines a mapping between (1) parameters of GUI objects in window (or windows) 170 displayed in screen (or screens) 180 by GUI module 190 of application 120, and (2) input and output fields of database operations. Examples of GUI object parameters are object names, object attribute names, and form names.

GUI module 190 need not be a sequential block of computer instructions but may include instructions scattered throughout application 120.

Link manager 140 and application 120 interact via GUI server 210. Server 210 provides an interface to keyboard 220, mouse 230, screen 180, and GUI module 190. In some embodiments, GUI server 210 is a commercially available server, for example, an X-windows server described in E. F. Johnson and K. Reichard, "Advanced X Window Applications Programming" (2nd Ed. 1994) hereby incorporated herein by reference. To create mapping file 160, the user interacts with link manager 140 and application 120 using mouse 230 and/or keyboard 220.

Link manager 140 causes GUI server 210 to display on screen 180 link manager window (or windows) 164, database viewer window (or windows) 166, and perhaps other windows. The user selects, in window 166, database objects such as database tables or stored procedures. The link manager transfers the selected objects to window 164. The user uses the link manager to construct in window 164 representations of database (DB) operations such as queries or stored procedures.

In particular, the link manager represents in window 164 input and output fields of the database operations. The user uses mouse 230 and/or keyboard 220 to drag and drop user interface objects (UI objects) from application window 170 to the input fields in link manager window 164 and to fields associated with DB operation output fields. The link manager traces the mouse movements to create a mapping between parameters of the UI objects and respective input and output fields of the database operations. The mapping data are then saved in mapping file 160.

At the stage illustrated in FIG. 2B, the user executes application 120. The user uses mouse 230 and/or keyboard 220 to interact with application 120 via GUI server 210 and GUI module 190. Execution manager 150 receives from application 120 requests to access database 130. Execution manager 150 reads mapping file 160 and constructs mapping objects which translate the application requests into formats of database 130. The DB 130 formats are defined by the DB API. The DB API includes embedded SQL interface in some embodiments.

Execution manager 150 receives responses from the database. The mapper objects created by the execution manager translate the responses into a format of application 120. Application 120 receives the responses. GUI module 190 uses GUI server 210 to display the responses in window 170.

In some embodiments, execution manager 150 itself requests server 210 to display the responses in window 170.

The user does not have to do any programming to create mapping file 160 at the FIG. 2A stage or to use the mapping file at the FIG. 2B stage. The stages of FIGS. 2A and 2B occur after application 120 has been built, and the application does not have to be rebuilt to create or change a mapping between the application and the database.

In some embodiments, the link manager creates a separate mapping file for each database operation, e.g., for each query.

Figure 3:
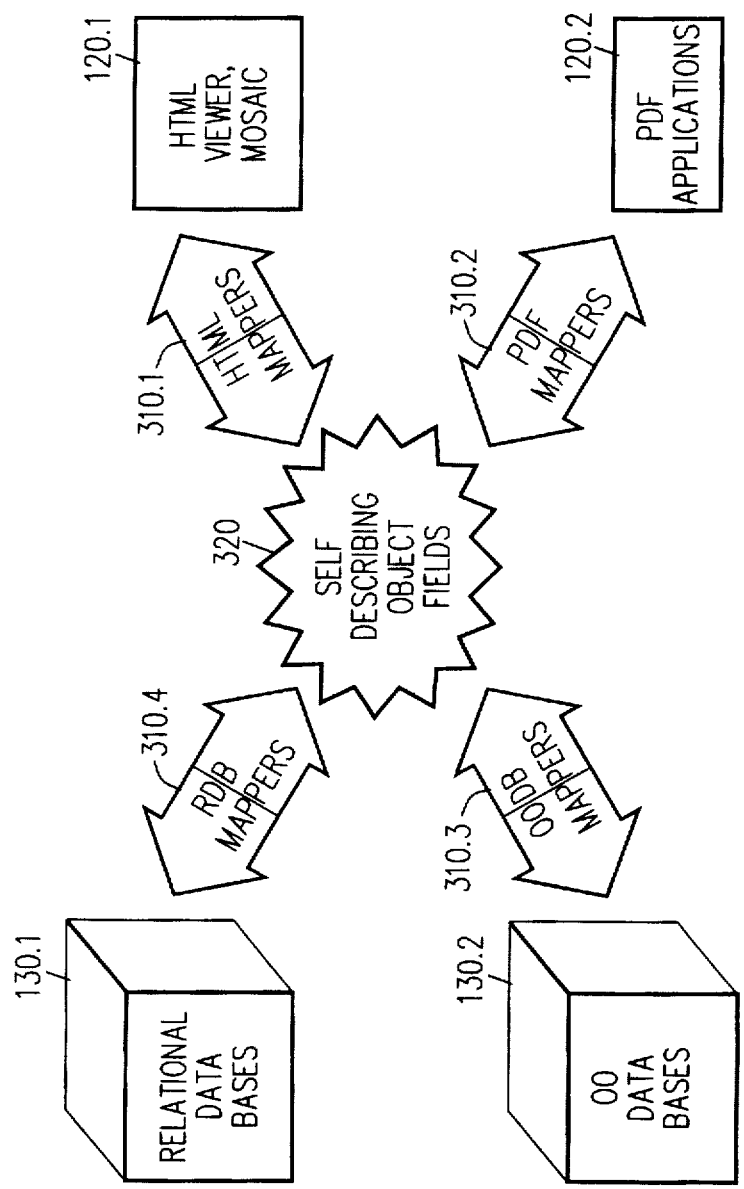
FIG. 3 is a block diagram illustrating the relationship between mapping file components, applications, and databases.

FIG. 3 illustrates a relationship between mapping file components and databases and applications. Applications 120.1, 120.2 interact with databases 130.1, 130.2. Reference numeral 120.1 denotes HTML applications such as HTML Viewer or Browser (e.g. Mosaic®). Reference numeral 120.2 denotes applications that use the PDF interface rules. PDF is an extension of the PostScript® language. An example of a PDF application is Acrobat® available from Adobe Systems, Inc. of Mountain View, Calif. Reference numeral 130.1 denotes relational databases. Reference numeral 130.2 denotes object oriented databases. Mappers 310.1, 310.2 map data between applications and self-describing object fields 320. Mappers 310.4, 310.3 map data between databases 130.i and self-describing object fields 320. Each mapper 310 includes computer instructions (e.g., procedures) to map data. Some mappers 310 also include data ("mapping data") that define the mapping. The mapping data and self-describing object fields 320 are stored in mapping file 160. Thus, file 160 allows storing the mapper objects 310.

The mappers' instructions are part of execution manager 150.

Each self-describing object field 320 defines a computer value format. To provide an application/database interface for an application that uses a different set of interface rules, or for a database that uses a different API, it is sufficient to provide a new mapper that maps data between the application and SD fields 320. To provide a new mapper, one has: (1) to provide new mapper instructions in execution manager 150 and, possibly, (2) to modify link manager 140 to generate mapping data for the new mapper. Execution manager 150 includes a function call interface for a mapper, and thus provides a linkage for any mapper. Thus, in some embodiments, in order to provide instructions for a new mapper, it is sufficient to provide (1) a new function for mapping from the application to the SDO fields, and (2) a new function for mapping from the SDO fields to the application. Providing instructions for a new database mapper is similar.

Each SDO field includes an SD type (such as "string" or "integer") of the corresponding computer value. An application 120 using different interface rules may need additional SD types. Self-describing types are listed in a separate file read by the link and execution managers, as described below in connection with FIG. 14. Additional SD types can be added simply by addition to that file.

The mappers and SDO fields allow in some embodiments different applications to interact with each other, and different databases to interact with each other.

At the link manager stage of FIG. 2A, application 120 does not have to perform any functions except providing parameters of the application GUI objects to link manager 140. Thus, in some embodiments, only a portion of application 120 is loaded into the computer system at the stage of FIG. 2A.

Execution manager 150 does not have its own user interface in some embodiments.

The link and execution managers will now be illustrated on the example of an HTML Viewer (such as Mosaic). FIG. 4 illustrates the stage of FIG. 2B for one HTML Viewer embodiment. HTML Viewer 120 interacts with execution manager 150 via the Internet 410 and WWW (World Wide Web) server 420 by means of an http (hypertext transfer protocol).

Server 420 sends information to execution manager 150 via Common Gateway Interface (CGI) described, for example, in I. S. Graham, "HTML Sourcebook" (1995) hereby incorporated herein by reference. Execution manager 150 responds to server 420 in HTML. Server 420 passes the responses to HTML Viewer 120 which displays the responses.

At the stage of FIG. 2A, WWW server 420 does not have to be present in the computer system and need not be executed.

FIG. 5 diagrams the process flow of the link manager stage of FIG. 2A. The process of FIG. 5 will be described on the example of the HTML Viewer interacting with a relational database that includes data on customers. In process 510, the user uses mouse 230 and/or keyboard 220 to command application GUI module 190, via GUI server 210, to display window 170 on screen 180. GUI module 190 displays the window by issuing appropriate commands to GUI server 210. Referring to HTML Viewer 120, the user causes the HTML Viewer to display in window 170 (FIG. 6) objects defined in an HTML source file. The objects include field 170.2 for a customer name and field 170.3 for a customer phone number.

In process 520, the user uses mouse 230 and/or keyboard 220 to command the link manager 140, via GUI server 210, to display link manager window 164 (FIG. 7) in screen 180. The link manager displays window 164 by issuing appropriate commands to GUI server 210. The user uses buttons 164.1 to configure the link manager window 164 for an HTML type application. Areas 164.2 through 164.6 and 164.10 of window 164 are empty in process 520.

In process 524, the user commands link manager 140 to invoke database viewer 162. Database viewer 162 of database 130 is linked with link manager 140 in some embodiments, and is linked separately in other embodiments. In process 530, the user commands database viewer 162 to display database viewer window 166 (FIG. 8). Button 166.2 in window 166 allows the user to select "Database tables" or "Stored procedures". In the example of FIG. 8, the user selects "Database tables". Database viewer 162 obtains the table names from DB 130 and displays the table names in field 166.4 of window 166.

Figure 7:
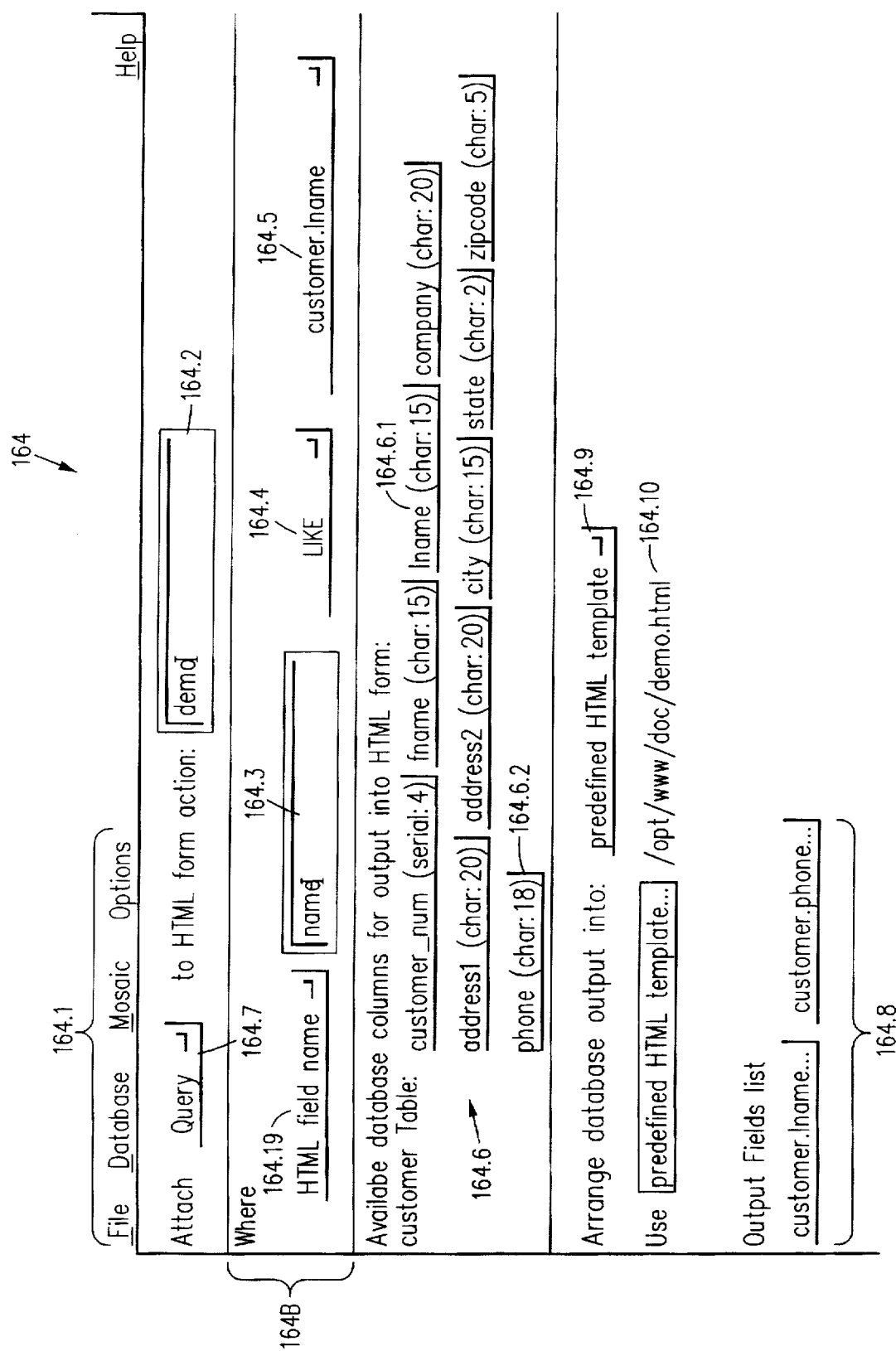

In process 534, the user uses mouse 230 and/or keyboard 220 to select the table "customer". In process 536, at the user's command, database viewer 162 obtains from DB 130 column names of the "customer" table and passes them to link manager 140. Link manager 140 commands GUI server 210 to display the column names of the "customer" table in sub-window 164.6 (FIG. 7).

Figure 6:
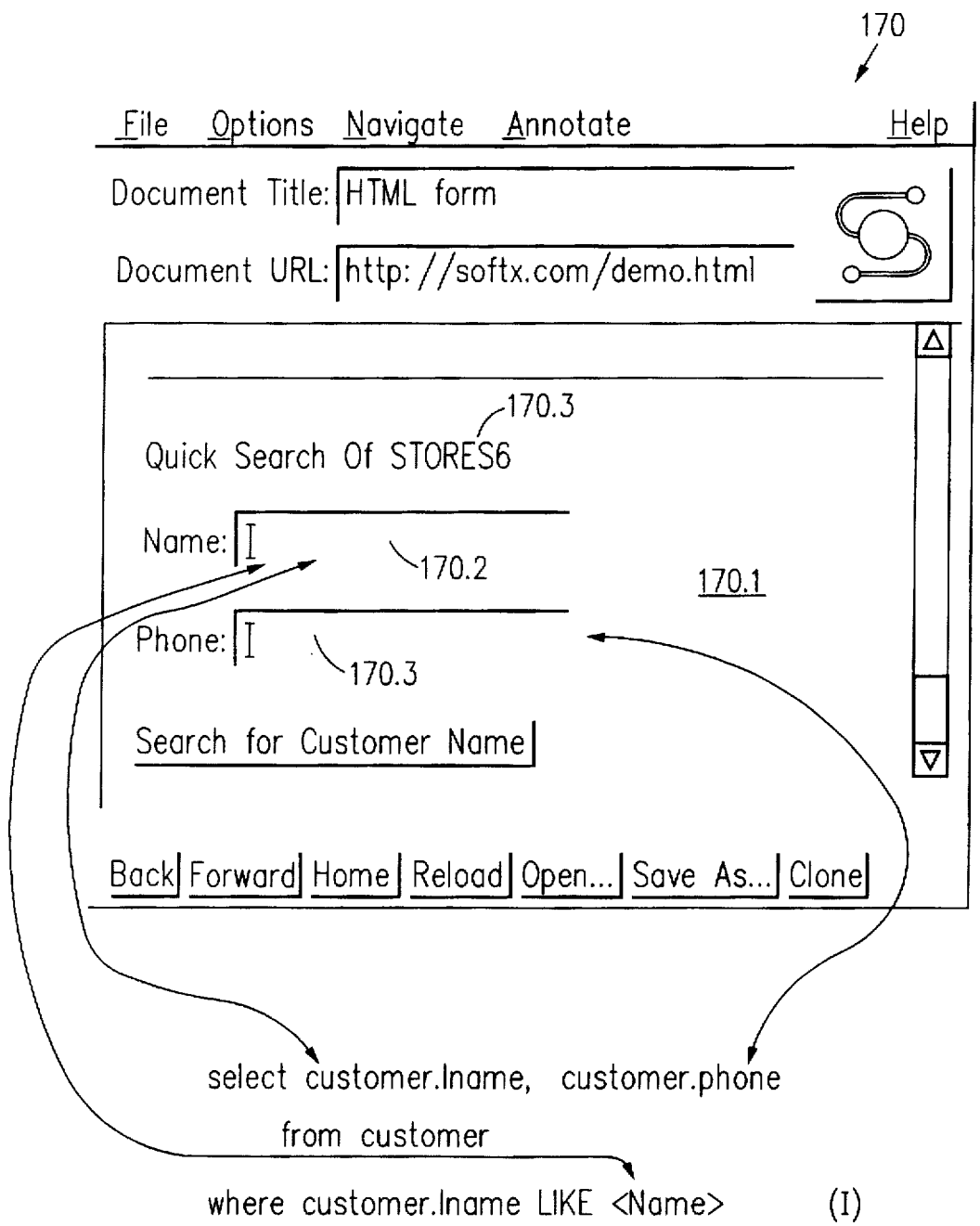

The user uses mouse 230 to construct a mapping for the following SQL query (I):

select customer.lname, customer.phone from customer where customer.lname LIKE <input value>    (I)

wherein <input value> is the value of Name field 170.2. This value is provided at the stage of FIG. 2B by application 120 to execution manager 150. FIG. 6 illustrates by arrows a mapping between (1) the query input and output fields <input value>, customer.lname, customer.phone, and (2) fields 170.2, 170.3 of window 170. The mapping between application window fields and DB operation fields is a many-to-many mapping in some embodiments.

To construct the mapping in computer memory, the user uses mouse 230 to select the option "query" in field 164.7 (FIG. 7). Then the user clicks on a window 170 area not associated with any field, such as area 170.1 (FIG. 6). The user drags and drops the area into field 164.2 (FIG. 7). Link manager 140 inserts the HTML form name, "demo", in field 164.2. Link manager 140 will use the form name to construct the name of mapping file 160 and of records in the mapping file.

The user clicks on the HTML "name" field 170.2 and drags and drops the mouse pointer into field 164.3 which represents the input field <input value> of query (I). Link manager 140 inserts the HTML GUI object name "name" into field 164.3.

The user uses mouse 230 to select in field 164.4 the "LIKE" operator from a menu list of operators.

The user clicks on field 164.5. Link manager 140 displays in response a pull-down menu including all the column names of sub-window 164.6. The user selects, with mouse 230, the column "customer.lname", i.e., last name. Link manager 140 inserts the column name "customer.lname" in field 164.5.

Some X window embodiments use the following drag and drop mechanism to allow the user to drag the HTML form name or an HTML object name from the application window 170 to link manager window 164. Application 120 is linked with a "drag-and-drop" module which asks X-windows server 210 to be informed of the event that the user pressed a middle button of a 3-button mouse while the mouse pointer was in window 170. The middle button is chosen to avoid confusion with other functions of the application since most applications do not use the middle button. When the user presses the middle button, and the mouse pointer is in window 170, X-windows server 210 passes to application 120 an identifier of window 170. If the mouse pointer is in a GUI object in window 170, X-windows server 210 also passes an identifier of the object. The drag-and-drop module makes a standard X-windows server call Widget-to-Name to translate the identifiers to the respective string names. The module inserts the string names into a data structure to be returned by X-windows server 210 when the user releases the middle button.

Link manager 140 asks X-windows server 210 to be informed of the event that the middle button is released while the mouse pointer is in link manager window 164. When the event occurs, link manager 140 receives the data structure from X-windows server 210 and extracts the form name and/or object name from the data structure.

Thus, the user builds an SQL query-by-example in which the input value or values are replaced by names of corresponding application GUI objects. At the stage of FIG. 2B, the execution manager replaces the GUI object names with the GUI object values.

In some embodiments, the stage of FIG. 2B uses a separate version of application 120. This version is relinked without the drag-and-drop module.

At the link manager stage of FIG. 2A, the user supplies information on the query output fields to enable translation of the database response. More particularly, the user clicks on fields 164.6.1 ("lname") and 164.6.2 ("phone"). Link manager 140 inserts "customer.lname" and "customer.phone" into output fields list 164.8. The user uses mouse 230 to command the link manager to display the window 164-A (FIG. 9) in screen 180. Window 164-A contains sub-windows 910.1, 910.2 each of which can be used for defining the mapping of an output field. Field 910.1.1 in sub-window 910.1 shows "customer.lname". The user drags and drops field 170.2 (FIG. 6) from HTML Viewer window 170 to field 910.1.2 of sub-window 910.1 to associate the output field "customer.lname" of the database response with the HTML object name "name". The drag-and-drop module passes the HTML object name to link manager 140 using the Widget-to-Name call as described above. The user specifies the maximum length in field 910.1.3 for the "name" output field. Similarly, the user drags and drops the HTML field 170.3 (FIG. 6) to field 910.2.2 to associate the output field "customer.phone" (see field 910.2.1) with the HTML object name "phone". The user specifies the maximum length 18 in field 910.2.3 for the "phone" output field.

The user can specify more than two output fields in output fields list 164.8. The user uses the "Prev" and "Next" buttons in sub-window 910.1 and/or 910.2 to make the sub-window available for another output field.

When the output fields mapping has been defined, the user presses the "Close" buttons in sub-windows 910.1, 910.2 to remove window 164-A from screen 180.

The user selects the option "predefined HTML template" in field 164.9 (FIG. 7), and inserts file name "/opt/www/doc/demo.html" into field 164.10. The template is created during the application building process and thus is not created by link manager 140. Link manager 140 knows now that the fields "customer.lname" and "customer.phone" are to be extracted from the database response, truncated respectively to 15 and 18 characters, and inserted into predefined place holders in an HTML template stored in the file shown in field 164.10. The insertion turns the template into an HTML page. If DB 130 returns more than one row, a separate copy of the template is used to create one HTML page for each row. Execution manager 150 provides the HTML pages to application 120 as a response to the SQL query.

The user now clicks on sub-field "File" in field 164.1, and then on the option "Save" in a pull-down menu (not shown) displayed under "File". Link manager 140 creates self-describing object fields 320 and mapping data for mappers 310.4, 310.1 (FIG. 3) and saves the mapping data and the self-describing object fields data in file 160.

The contents of file 160 are shown in appendix A at the end of this description. In appendix A, the line numbers on the left are used herein as reference numbers. The line numbers do not appear in file 160 in some embodiments.

Also, the text between /* and the following */ does not appear in mapping file 160.

File 160 is an ASCII file. Thus, file 160 is easy to read and understand if needed, for example, in debugging or development. Double quotes are used as delimiters for tokens.

Figure 10:
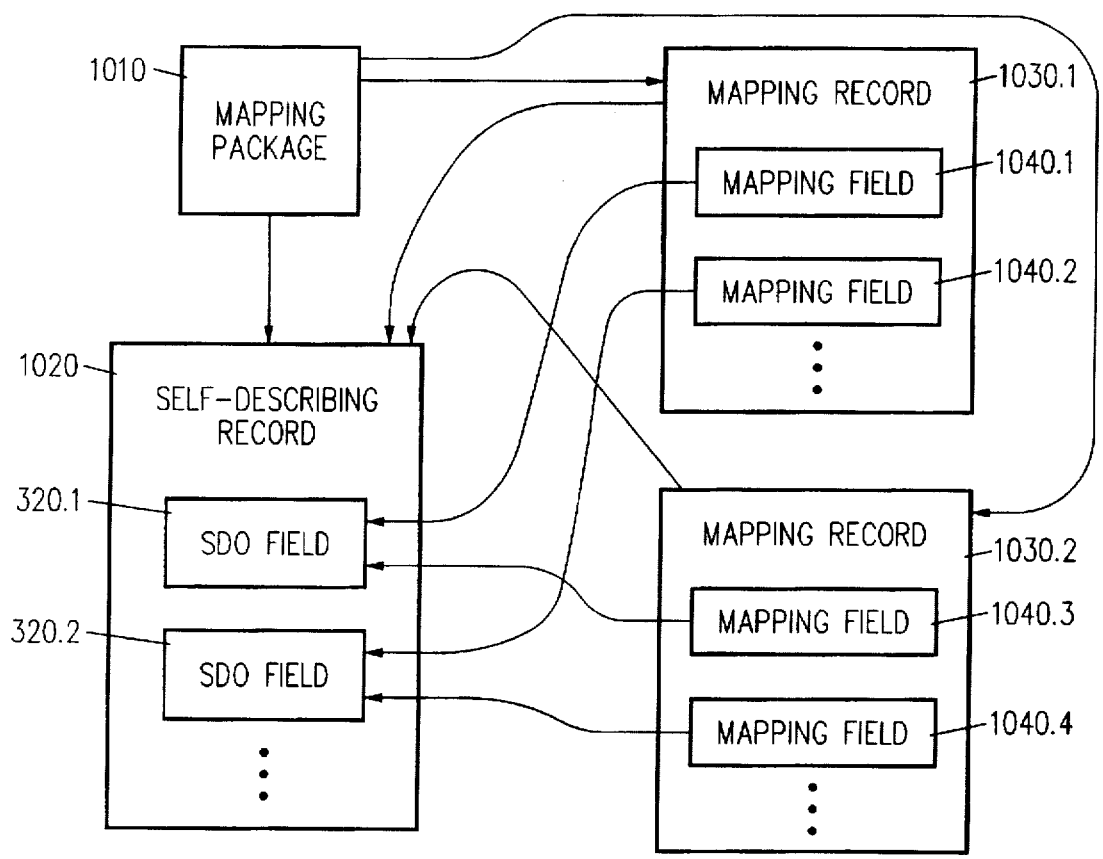
FIG. 10 is a block diagram of a portion of a mapping file.

Lines 1 through 52 define the mapping from HTML Viewer 120 to database 130. Lines 53 through 93 define the mapping in the opposite direction, that is, from database 130 to HTML Viewer 120. The mapping in each direction is defined by data schematically shown in FIG. 10. The mapping data for each direction include mapping package record 1010 which points to all the other records for that direction. The other records are: (1) self-describing record 1020 with self-describing object fields 320; (2) mapping record 1030.1 of mapper 310.1 or 310.2 (FIG. 3) for mapping between application 120 and self-describing object fields 320, in the relevant direction; and (3) mapping record 1030.2 of mapper 310.4 or 310.3 for mapping between self-describing object fields 320 and database 130, in the same direction. Each mapping record 1030 includes a mapping field 1040 for each data item. Each mapping field points to a corresponding self-describing object field 320.

Similar mapping files provide mapping between non-database computer programs.

In appendix A, mapping package record 1010 for the mapping from the HTML Viewer to database 130 appears in lines 2–8 and has a name "demo_html_to_db". In file 160, all the records are identified by names, and each pointer is a name. Record demo_html_to_db is identified as a mapping package record by a "Class" parameter in line 3. Each record has a class parameter identifying the record type. Record demo_html_to_db includes: (1) the self-describing record name "demo_html_to_db_sd" (line 5); (2) the mapping record 1030.1 name "demo_html_to_db_ht" (line 6); and (3) the mapping record 1030.2 name "demo_html_to_db_db" (line 7). The record names are formed by appending predefined strings (such as "_html_to_db_ht") to the HTML form name "demo".

In mapping file 160, each record is a (name, value) pair. Thus, mapping package record 1010 in lines 2–8 has a name in line 2 and a value in lines 3–7. The value itself is composed of (name, value) pairs. Thus, line 5 includes a name "selfDescRecordName" and a corresponding value "demo_html_to_db_sd".

Self-describing record 1020 (lines 9–17) has one self-describing object field 320.1 in lines 12–15, for the customer last name. The self-describing field's name is "name" (line 12). The type is "String" (line 13). The maximum length is 512 bytes (line 14).

Mapping record 1030.1 is shown in lines 18–31.

This record has in line 20 the name of the corresponding self-describing record 1020. Line 21 has the HTML form name. Mapping fields 1040 follow the keyword "COMPONENTS" (line 22). The only mapping field in the record (lines 23–29) describes the customer last name. Line 25 has the name "name" of the corresponding self-describing object field 320 (see line 12). Line 26 has the HTML pair name "name" of field 170.2 (FIG. 6). (In CGI, each HTML input or output field is identified by a (name, value) pair.)

Lines 27 and 28 are unused.

Mapping record 1030.2 appears in lines 32 through 52. This record stores the self-describing record name in line 34, the database name in line 35, and the SQL statement header in line 36. The stored procedure name appears in line 37. The stored procedure name is null because the "select" query (I) does not use a stored procedure. The only mapping field 1040, in lines 39–50, describes the only input field of query (I). More particularly, line 39 names the mapping field. Line 41 names the corresponding self-describing object.

Line 44 indicates that the database input field is of type string. In some embodiments, this indicates to execution manager 150 that at the stage of FIG. 2B the input field value must be enclosed in single quotes when the query is sent to the database.

Lines 42, 43 and 45 are unused.

Line 46 specifies the logical operator before the condition in lines 47–48. This condition is "customer.lname LIKE <input value>". Possible logical operators are AND, OR. Since no logical operator is used, line 46 shows "none".

Lines 47–49 define the qualification portion of the select query of line 36 to be where arg1Name LIKE <input value>

In the qualification portion, arg1Name=customer.lname (line 47), and <input value> is supplied from the self-describing field "name" (line 41) by execution manager 150 at the stage of FIG. 2B. Thus, mapping record 1030.2 in lines 32–52 permits constructing the SQL query.

Mapping package record 1010 for the mapping from database 130 to HTML Viewer 120 appears in lines 53–58. The corresponding self-describing record name is in line 56, the name of mapping record 1030.1 is in line 57. Mapping record 1030.2 is omitted. The mapping from database 130 to self-describing object fields 320 is performed without a mapping record as described below.

Self-describing record 1020 (lines 59–71) includes the "lname" self-describing object field in lines 62–65 and the "phone" self-describing object field in lines 66–69. The respective self-describing field names appear in lines 62, 66. The respective types are in lines 63, 67. The respective maximum lengths are in lines 64, 68. Zeroes in the length fields mean that the maximum lengths are to be obtained elsewhere. The maximum lengths are provided by mapping record 1030.1 (lines 81, 88).

Mapping record 1030.1 (lines 72–92) includes the corresponding self-describing record name in line 74. The file name containing the HTML template is in line 75. The file name is taken from field 164.10 (FIG. 7). The mapping fields in lines 77–90 describe the output fields of the database response. The "lname" mapping field (lines 77–83) includes the name of the corresponding self-describing field in line 79, the HTML input field name in line 82, and the maximum length in line 81. The maximum length is taken from field 910.1.3 (FIG. 9).

Line 80 is unused.

If the user does not specify a template in fields 164.9, 164.10 (FIG. 7), the output field values in a response will be returned to application 120 in a byte stream buffer. The "startLocation" in line 80 shows the index of the first byte of the output field in the HTML byte stream. "−1" means that the output field immediately follows the previous HTML field. For "lname" there is no previous field—the fields are in the order in which they appear in the mapping record, which is the same order as in output fields list 164.8 (FIG. 7). Hence, the startLocation value of −1 is equivalent to value 0 (the index of the first byte of the byte stream).

Some mapping record embodiments omit the "startLocation" when the user specifies an HTML template.

The "phone" mapping field (lines 84–90) includes the name of the corresponding self-describing field in line 86, the HTML field name in line 89, and the maximum length in line 88. The maximum length is taken from field 910.2.3 (FIG. 9). Line 87 is unused. If the user did not specify a template in fields 164.9, 164.10, line 87 would specify the start location.

Mapping from the database to the SD fields of record 1020 of lines 59–69 is an identity mapping that does not use a mapping record. More particularly, the database response output fields have the type "string", which coincides with the type of the corresponding SD fields (see lines 63, 67). The order of the output fields in the database response is the same as the order of the corresponding SD fields in record 1020, that is, customer.lname is first and customer.phone is second. This order is defined by the order of the database fields in output fields list 164.8 (FIG. 7). This order is conveyed to the database by the order of the corresponding output fields in the SQL query (I).

Thus, execution manager 150 does not use a mapping record in this embodiment.

In some embodiments, mapping records are used to map the database output to the self-describing fields.

Figure 11:
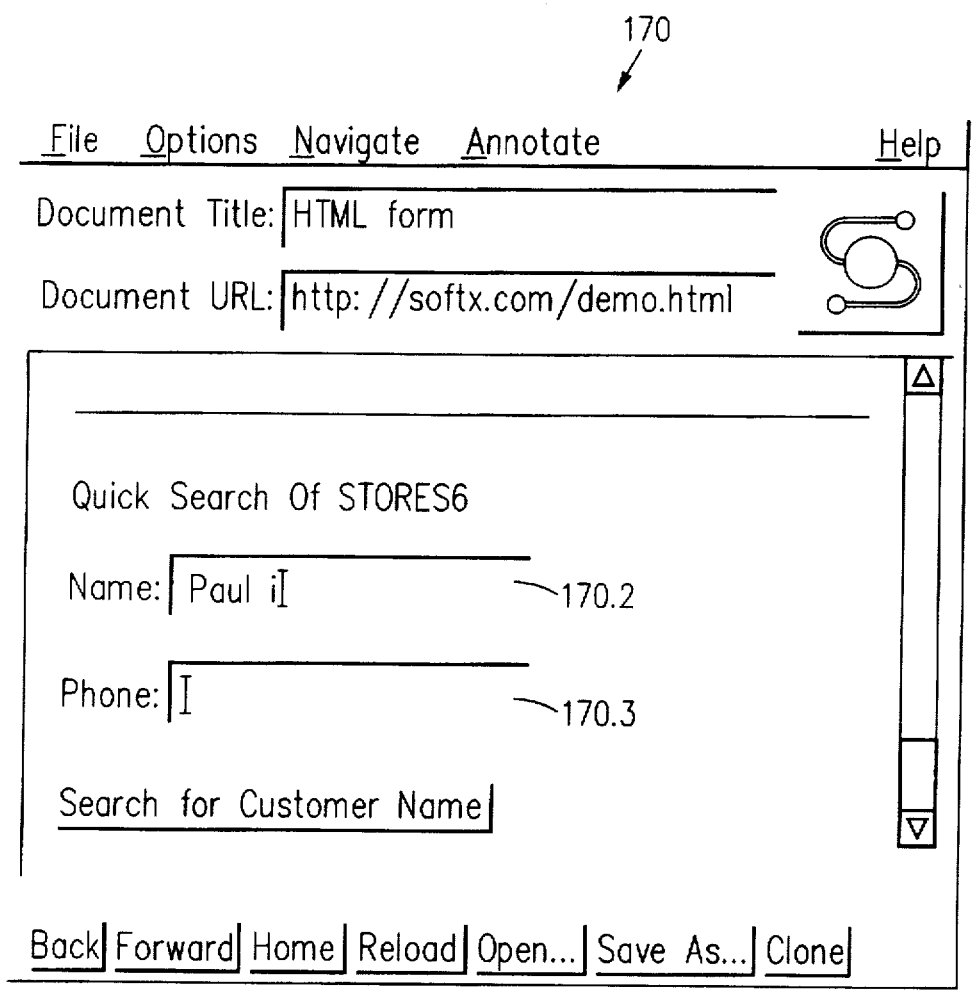
FIGS. 11 and 12 illustrate an application window at the stage of FIG. 2B.
Figure 12:
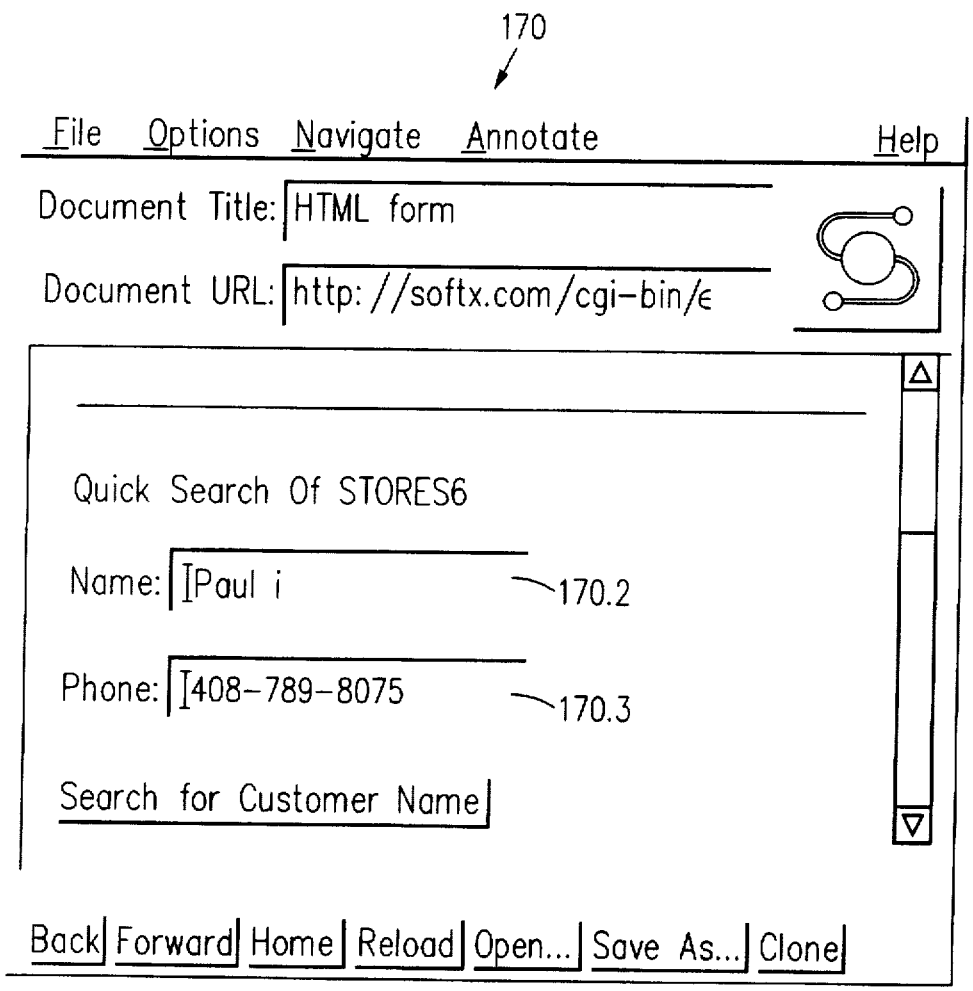

FIGS. 11 and 12 illustrate HTML window 170 at the stage of FIG. 2B. As shown in FIG. 11, the user enters a customer name "Pauli" in field 170.2 and presses the "Search for Customer Name" visual button. The HTML request is sent to WWW server 420 (FIG. 4) which passes the request to execution manager 150. Execution manager 150 determines the HTML form name from the request. From the HTML form name, the execution manager determines the name of mapping file 160. The execution manager combines the form name with predefined suffixes to determine the names of the mapping package records. Execution manager 150 reads mapping file 160 and constructs the query

```
select customer.lname, customer.phone from customer
where customer.lname LIKE Pauli
```

Execution manager 150 submits the query to database 130. The database returns result rows which include pairs (customer.lname, customer.phone). Execution manager 150 formats the rows according to the contents of mapping file 160. Execution manager 150 uses the HTML field names in lines 82, 89 to locate, in the HTML template, the corresponding place holders for the customer.lname and customer.phone output values. The execution manager inserts the output values into template copies, creating one HTML page for each row. Execution manager 150 provides the HTML pages to HTML server 420. The server forwards the pages to HTML Viewer 120. The HTML Viewer displays the pages in window 170 as shown in FIG. 12. The output page of FIG. 12 is similar to the input page of FIG. 6. In general, the output page does not have to resemble the input page.

The pages returned by execution manager 150 include in some embodiments images, audio information, and/or other types of information.

More generally, at the stage of FIG. 2A, under the control of the link manager, the user selects queries, stored procedures, and/or other database operations and parameters displayed as options in window 164 and/or 164-A and/or 166. Link manager 140 associates the dragged-and-dropped fields from application window 170 with fields of database 130. Link manager 140 associates window 170 parameters, such as HTML form names, with one or more database operations such as queries, data manipulation and definition operations, and stored procedures. Link manager 140 writes the data describing these associations to mapping file 160.

At the stage of FIG. 2B, execution manager 150 reads mapping file 160 and provides a corresponding interface between the database and the application.

Figure 13:
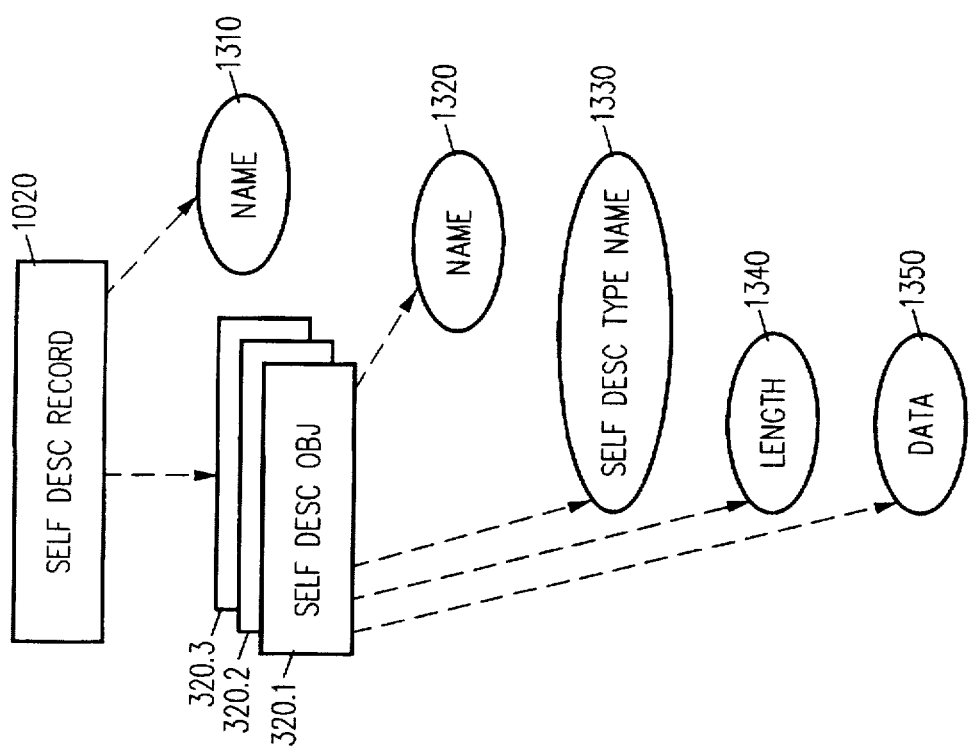

FIG. 13 illustrates self-describing records 1020 in some embodiments. Self-describing record 1020 has a name 1310 (lines 9, 59 in appendix A) and one or more self-describing object fields 320.i (i=1, 2, 3 in FIG. 13). The list of self-describing object fields starts with a keyword "COMPONENTS" (lines 11, 61 in appendix A). Self-describing field 320 has a name 1320 (lines 12, 62, 66 in appendix A), self-describing type name 1330 (lines 13, 63, 67 in appendix A), length 1340 (lines 14, 64, 68), and data 1350. Data field 1350 is not present in mapping file 160. Data field 1350 is allocated in computer memory by execution manager 150 for the actual data. Thus, with reference to FIG. 11, the self-describing field in lines 12–15 will include the name "Pauli" in its data field 1350. Similarly, data fields 1350 of the self-describing fields in lines 62–64 and 66–69 will include, respectively, "Pauli" and "408-789-8075".

Figure 14:
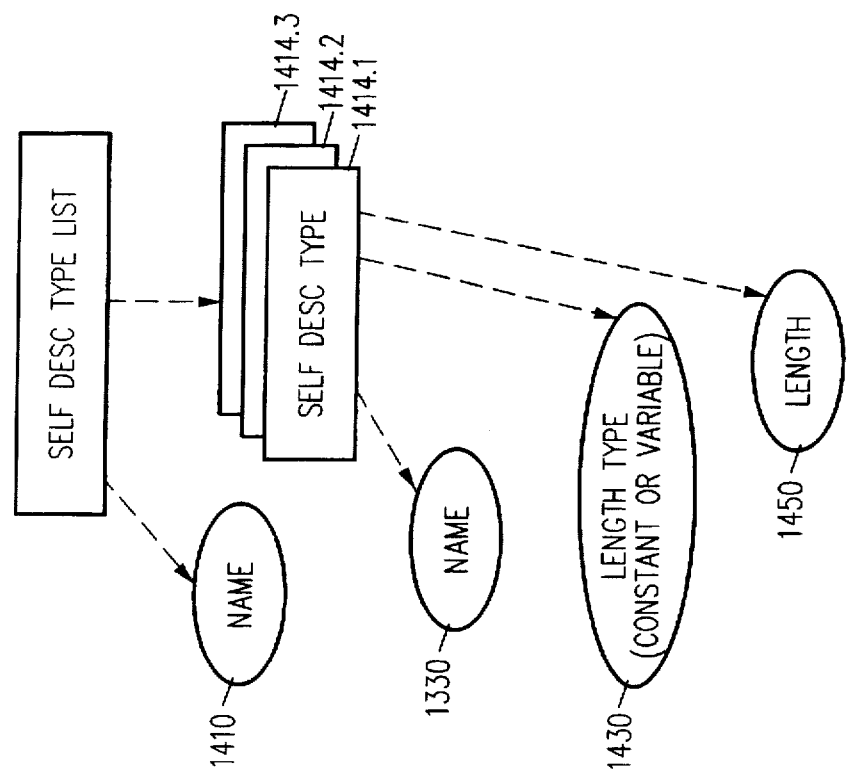
FIGS. 13, 14, 15A, and 15B illustrate portions of mapping files.

FIG. 14 illustrates self-describing types. The list 1404 of all the self-describing types is provided in a separate file and is read by link manager 140 and execution manager 150. Examples of types are string, integer, and floating point. The self-describing type list is identified by name 1410.

Each self-describing type 1414 in list 1404 has name 1330 by which the type is identified in self-describing fields 320. The "length type" flag 1430 in self-describing type 1414 indicates whether the length of each data item of this type is constant or variable. Length 1450 in type 1414 gives the data item length in bytes. Length 1450 is ignored if the length type 1430 is "variable". In some embodiments, list 1404 consists of three types: "string" having the length type "variable", and "integer" and "floating point". The "integer" and "floating point" types each have the length type "constant" and the length 1450 of 4.

Figure 15A:
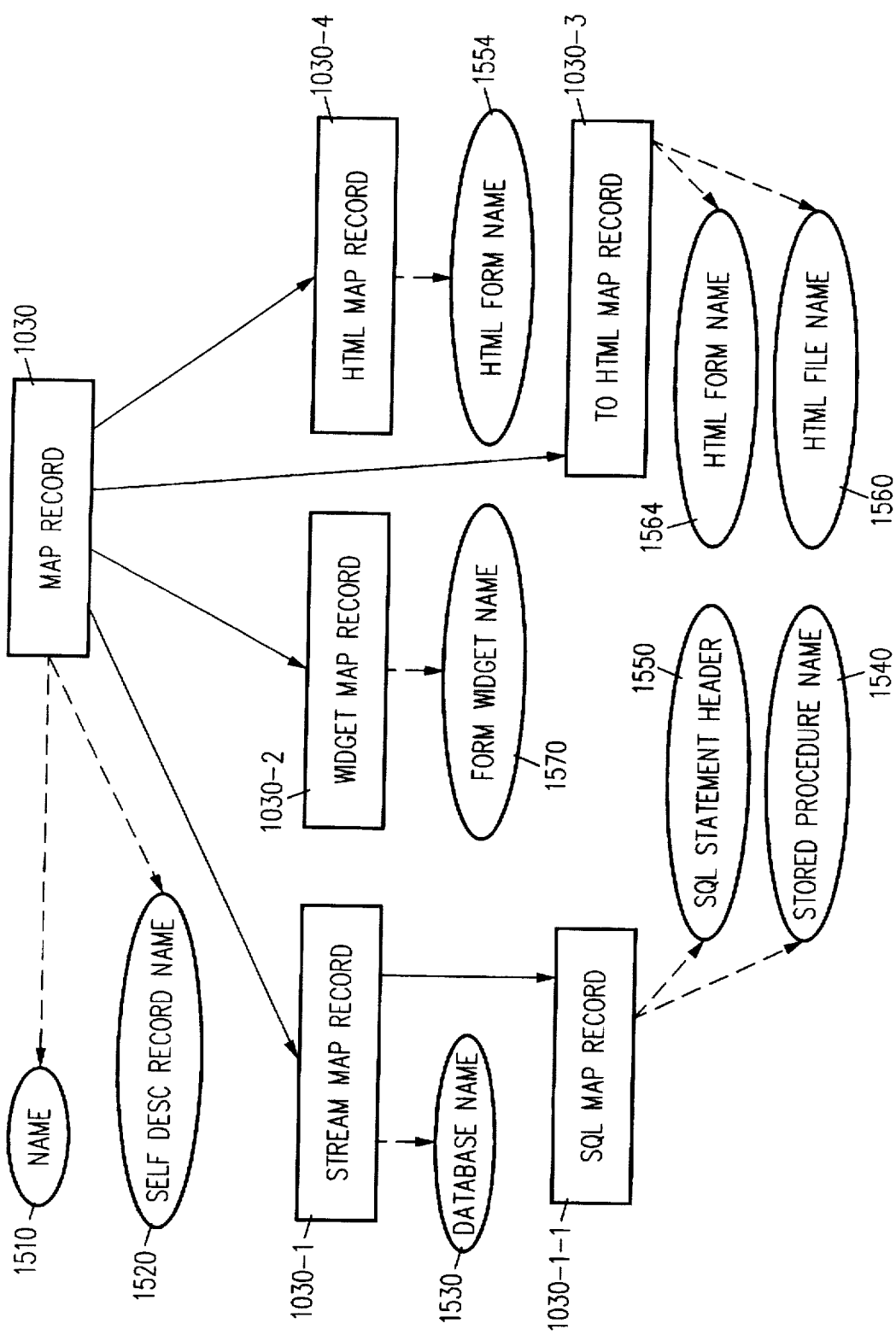
Figure 15B:
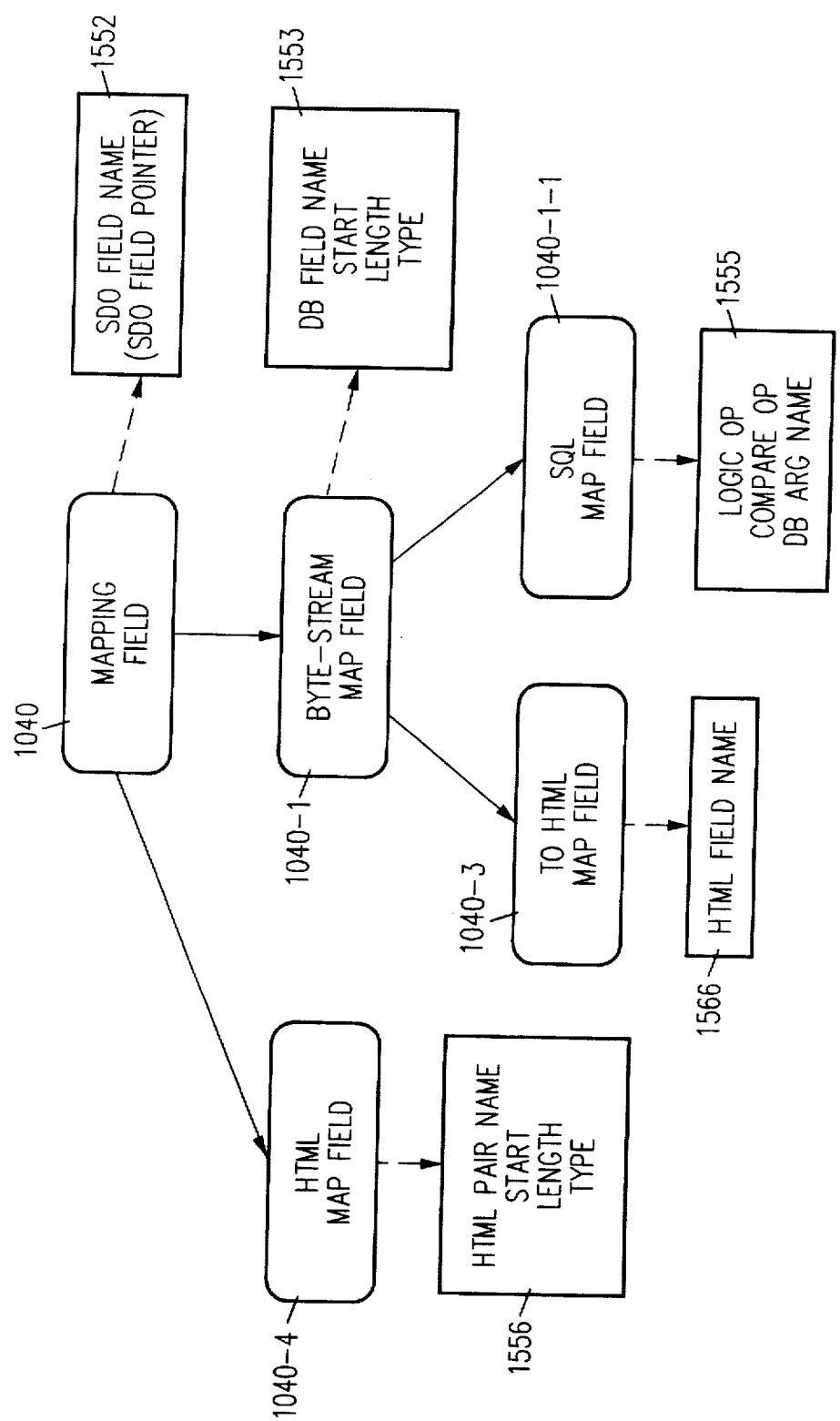

FIG. 15A illustrates the class structure of mapping records 1030. A mapper 310.i (FIG. 3) can include two such mapping records, one mapping record 1030 for the mapping in each direction. For each direction, execution manager 150 uses two mappers 310 and an SD record 1020. Mapping record 1030 includes its name 1510 (lines 18, 32, 72 in appendix A) and the name 1520 of the corresponding self-describing record (lines 20, 34, 74). Mapping record 1030 can belong to a class of stream mapping records 1030-1, a class of widget mapping records 1030-2, a class of "TOHTML" mapping records 1030-3, or a class of HTML mapping records 1030-4. Mapping record classes 1030-1, 1030-2, 1030-3, 1030-4 are called herein "derived" from class 1030. We will use reference numerals 1030, 1030-i both for classes of records and for individual records. Thus, each record 1030-i includes the fields of the "base" class 1030 plus, perhaps, additional fields. In FIGS. 15A, 15B the derived-class relationship is shown by a continuous arrow that starts at a base class and points to a derived class. Broken-line arrows show a "part of" relationship. A broken-line arrow starts at a class and points to a field in an object of the class.

SQL mapping record class 1030-1-1 is derived from stream mapping record class 1030-1.

FIG. 15B illustrates the class structure of mapping fields 1040.

Figure 16:
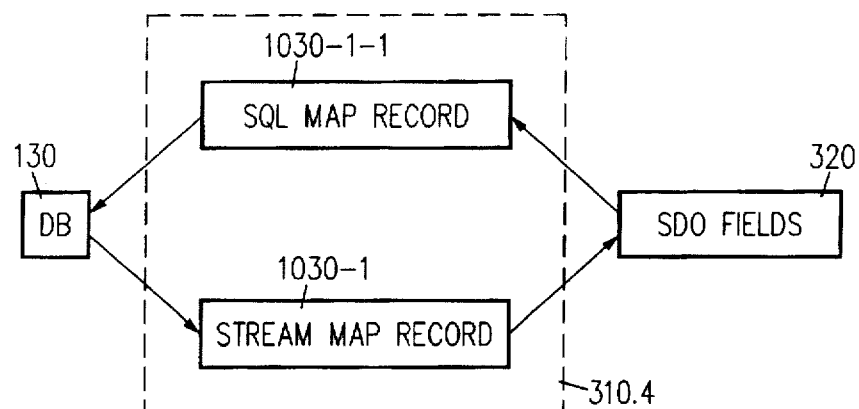
FIG. 16 is a block diagram illustrating a relationship between a database and a mapping file.

FIG. 16 illustrates mapping records 1030 in mapper 310.4 (FIG. 3) which maps data between self-describing fields 320 and relational database 130. Stream mapping record 1030-1 maps buffered result rows from database 130 to self-describing fields 320. This record is omitted in some embodiments as described above. SQL mapping record 1030-1-1 maps SQL statements and stored procedure calls in the opposite direction. The mapping record in lines 32–52 of appendix A is an SQL mapping record. Each stream mapping record 1030-1, and hence each SQL mapping record 1030-1-1, includes database name 1530 (FIG. 15A and line 35 in appendix A). SQL mapping record 1030-1-1 includes stored procedure name 1540 (line 37) and SQL statement header 1550 (line 36).

Each mapping field 1040 of mapping record 1030 includes its name (line 39) and a pointer 1552 to the corresponding self-describing field 320 (FIG. 15B and line 41).

Each mapping field 1040-1-1 (FIG. 15B) of SQL mapping record 1030-1-1 belongs to a class derived from byte-stream mapping field 1040-1 derived from mapping field class 1040. Each mapping field 1040-1-1 is identified by the Class value MapSql (line 40). As shown at 1553 in FIG. 15B, byte-stream mapping field 1040-1 includes a DB field name (line 45), a start location (line 42), and a length (line 43), which are unused in some embodiments. Fields 1553 also include a type (line 44) of the corresponding input field in the SQL request. As shown at 1555, each mapping field 1040-1-1 includes a logic operator such as AND, OR or NOT ("none" in line 46), a compare operator (line 48), and the name of one or two DB arguments for the compare operator (line 47).

In some embodiments, one or more mapping fields 1040-1-1 of record 1030-1-1 include a prefix string to be inserted at the beginning of the corresponding input field, and a suffix string to be inserted at the end of the input field. For example, a string input field of an SQL request may have to be enclosed in single quotes. In this case, the prefix and suffix strings are each a single quote. In the embodiment of appendix A, prefix and suffix strings are not used, but execution manager 150 inserts quotes around string input values.

FIG. 17 illustrates mapping records 1030 in mapper 310.1 which maps data between HTML Viewer 120 and self-describing fields 320. HTML mapping record 1030-4 maps data from HTML Viewer 120 to self-describing fields 320. The mapping record in lines 18–31 of appendix A is an HTML mapping record, as shown by the class parameter MapHTML (see line 24) in each mapping field of the record. Record 1030-4 includes HTML form name 1554 (line 21). Each mapping field 1040-4 (FIG. 15B) of HTML mapping record 1030-4 belongs to a class derived from mapping field class 1040. As shown at 1556 in FIG. 15B, each mapping field 1040-4 includes the corresponding HTML pair name (line 26), a start location (line 27), a length (line 28), and a type. The start location and length are unused and are omitted in some embodiments. The type of an HTML field in application window 170 is always "string" and is not explicitly specified in the mapping record in lines 18–31.

Mapper 310.1 includes one of mapping records 1030-1, 1030-3. If the user requests the database output to be provided as an HTML template (see field 164.9 in FIG. 7), the mapping from self-describing fields 320 to HTML Viewer 120 is performed with "ToHTML" mapping record 1030-3. If the user requests the output in the form of a report, the mapping is performed with stream mapping record 1030-1. The mapping record in lines 72–92 in appendix A is a "ToHTML" mapping record, as indicated by the class parameters "MapToHtml" in the record's mapping fields in lines 78 and 85. Each "ToHTML" mapping record 1030-3 includes the name 1560 of the file storing the template (FIG. 15A and appendix A, line 75). Each mapping field 1040-3 (FIG. 15B) of "ToHTML" mapping record 1030-3 belongs to a class derived from bytestream mapping field class 1040-1. In fields 1040-3, the "type" shown at 1553 is omitted because in fields 1040-3 the type is always "string". Each mapping field 1040-3 includes the name 1552 of the corresponding self-describing field (lines 79, 86), HTML field name 1566 (lines 82, 89), and the length (shown at 1553 in FIG. 15B; see also lines 81, 88). HTML field name 1566 is used to identify the corresponding place holder in the HTML template.

HTML form name 1564 (FIG. 15A) of "ToHTML" mapping record 1030-3 is the name of mapping file 160 and is not physically present in "ToHTML" record 1030-3 in some embodiments.

FIG. 18 illustrates mapping records in a mapper 310 which maps data between (1) application 120 whose GUI module 190 uses a Motif toolkit, and (2) self-describing fields 320. Motif, which uses widgets, is described in E. F. Johnson and K. Reichard, "Advanced X Window Applications Programming" (2nd Ed. 1994) at pages 169–182 hereby incorporated herein by reference. Widget mapping records 1030-2 are used for the mapping in both directions. Each widget mapping record 1030-2 includes a widget form name 1570 (FIG. 15A) used similarly to HTML form name 1564. Each mapping field 1040 of widget mapping record 1030-2 corresponds to an attribute of a widget. Examples of attributes are a text field value, background color, foreground color, sound.

Now the link manager user interface will be described in detail. FIGS. 19A, 19B illustrate link manager window 164, displayed in screen 180, for the following query (II):

```
select catalog.catalog_num, catalog.stock_num, catalog.cat_ad-
       vert, stock.description, stock.unit_price, stock.unit, stock.unit_
       descr, catalog.cat_picture, catalog.cat_descr, manufact.manu_
       code, manufact.manu_name from catalog, manufact, stock where stock.stock_num=catalog.stock_num AND stock.manu_code=catalog.manu_code AND manufact.manu_code=catalog.manu_code AND (catalog.catalog_num=catalog_num1

OR (catalog.catalog_num<catalog_num2

AND catalog.catalog_num>catalog_num3))                    (II)
```

To construct this query, the user selected three tables "catalog", "manufact", and "stock" in database viewer window 166 (FIG. 8) displayed in screen 180. Link manager 140 displays the column names of the three tables in sub-window 164.6 (FIG. 19B).

The user clicks on the names of the output fields in sub-window 164.6. Link manager 140 displays the output field names in output fields list 164.8.

The qualification portion sub-window 164B of FIG. 19A is similar to sub-window 164B in FIG. 7. In FIG. 19A, sub-window 164B includes six lines each of which defines a comparison operation. Each line is similar to the only such line in FIG. 7. In the embodiment of FIG. 19A, field 164.5 appears to the left of field 164.4 rather than to the right as in FIG. 7. Field 164.3 appears to the right of field 164.4. Field 164.19 determines whether field 164.3 contains a database field name, an HTML field name, or a constant value. Field 164.19 appears immediately before field 164.3 in FIGS. 7, 19A. In the first three lines of the "where" condition in sub-window 164B in FIG. 19A, field 164.3 contains a database field name which is one of the column names of sub-window 164.6. In the last three lines, field 164.3 contains an HTML field name dragged and dropped from window 170. In particular, "catalog_num1", "catalog_num2", "catalog_num3" are HTML field names.

Initially, link manager 140 displays in sub-window 164B one condition line, as in FIG. 7. The user fills in the line as discussed above in connection with FIG. 7. When the user presses the button 164.4, link manager 140 displays a pull-down menu of operators. The user selects an operator from the menu. When the user presses the button 164.19, link manager 140 displays a pull-down menu having three options: "Database Field", "HTML field name", and "Constant". The user selects one of the options. If the option is "Database Field", link manager 140 displays a pull-down menu with all the column names of sub-window 164.6 when the user clicks on the corresponding button 164.3. The user selects a column name for field 164.3. If the option in field 164.19 is "HTML field name", the user drags and drops an HTML field name from application window 170 to the corresponding field 164.3. If the option is "Constant", the user types the constant value in the corresponding field 164.3.

The user uses the left mouse button to fill in the first "where" line. To create the next "where" line, the user positions the mouse pointer on the first "where" line and presses the right mouse button. Link manager 140 displays a pull-down menu with the options "add where clause", "remove where clause", "add (", "remove (", "add )", "remove )". The user selects the "add where clause" option. Link manager 140 displays the second "where" line. The second and remaining lines are similar to the first line, but each line starting with the second contains an additional visual button 164.20 for a logical operator. When the user pushes the button 164.20, link manager 140 displays a pull-down menu with the operator names. The menu includes AND and OR operators.

The user fills in the second and each subsequent "where" line similarly to the first line. If the user presses the right mouse button and selects an option "add (" or "remove (" when the mouse cursor is on a "where" line, link manager 140 adds or removes a "(" before field 164.5 of the line. If the user selects "add )" or "remove )", link manager adds or removes a ")" at the end of the corresponding line. The user can remove a "where" line by positioning the mouse cursor on the line, pressing the right mouse button, and selecting the "remove where clause" option.

For each "where" line, link manager 140 creates mapping data illustrated at 1555 in FIG. 15B. The mapping data for one "where" line are shown in lines 44–49 of appendix A. The logic operator name in field 164.20 appears in line 46. The database column name in field 164.5 appears in line 47 under "arg1Name". The compare operator name in field 164.4 appears in line 48. If field 164.19 shows "Database Field", the database column name in field 164.3 is inserted under "dbFieldName" (line 45). If field 164.19 shows "HTML field name", the HTML field name in field 164.3 is described by its name and type. The name is given as the name of the mapping field in line 39. The type is given in line 44. If field 164.19 shows "Constant", the constant is inserted under an appropriate name in SQL mapping field 1040-1-1.

A separate mapping field 1040-1-1 is created for each "where" line. For "where" lines which do not include an HTML field name, SQL mapping record 1030-1-1 contains a mapping field 1040-1-1 which does not correspond to a self-describing field 320 and thus does not include a "selfDescFieldName" entry.

The user can select in field 164.7 a database operation other than a query (FIG. 19A). When the user pushes button 164.7, link manager 140 displays a menu with the options "Query", "Update", "Insert", "Delete", "Stored procedure". If the user selects "Update" or "Delete", the user constructs in sub-window 164B the query portion of the "Update" or "Delete" operation to specify the database rows to be updated or deleted. If the user selects "Insert" or "Stored procedure" in field 164.7, link manager 140 displays the input and output fields of the "Insert" or "Stored procedure" operation. The user associates the input and output fields with database column names and/or HTML field names in a way similar to inserting the database column names and HTML field names into a "where" line.

In some embodiments, link manager 140 provides a text editor that allows the user to create or modify the parameters in sub-window 164B.

FIG. 20 illustrates the execution manager stage of FIG. 2B for a Motif application. The application includes application-specific code 120, execution manager 150, Motif libraries 2010, and X-libraries 2020, all linked together to form one UNIX process. Application-specific code 120 and execution manager 150 use Motif libraries 2010 for GUI operations. Motif 2010 runs on top of X-windows server 210.

In some embodiments, execution manager 150 is linked separately from application-specific code 120.

A request from application-specific code 120 to execution manager 150 includes information sufficient to identify the relevant mappers and SD records in the mapping file. The request includes also a pointer to the root of the Motif widget tree to enable execution manager 150 to find Motif widget pointers by name. Execution manager 150 makes function calls to Motif libraries 2010 to obtain the widget attribute values. These calls are well known in the art. Execution manager 150 inserts the attribute values into input fields of a database operation and provides the operation to database 130. When database 130 responds, mappers 310 of execution manager 150 translate the database output fields to an appropriate format, and execution manager 150 submits the output fields to Motif libraries 2010 as values of widget attributes. Motif libraries 2010 uses X-windows server 210 to display the attribute values in application window 170 in screen 180.

Link manager 140 and execution manager 150 can be stored in a computer readable medium such as a computer disk. When link manager 140 or execution manager 150 are loaded by a computer system from the medium into a computer memory, they reconfigure the computer system to be a special purpose machine that executes the link or execution manager.

The microfiche appendix provides a source code for one embodiment of link manager 140, execution manager 150, and a drag-and-drop module to be linked with application 120 for interaction with the link manager. The source code is written in C++. The program in the microfiche appendix can be compiled with a GNU C++ compiler (gcc version 2.6.3) available from the Free Software Foundation of Cambridge, Mass. The program can be compiled on a computer of type SUN® SparcClassic® available from Sun Microsystems of Mountain View, Calif. and running a UNIX operating system of type Solaris® version 2.3. The program uses the class library Rogue Wave Tools.h++® version 6 available from Rogue Wave Software, Inc. of Corvallis, Oreg., an Informix RDBMS version 6.0 available from Informix Software, Inc. of Menlo Park, Calif., and a Sybase RDBMS version 10 available from Sybase, Inc. of Emeryville, Calif.. The program can be executed on the same computer running the same operating system and also running an X-windows server of type Motif, version 1.2, available from the Open Software Foundation of Cambridge, Mass..

While the invention has been illustrated with respect to the embodiments described above, other embodiments and variations are within the scope of the invention. The invention is not limited to any particular computer system, operating system, or GUI server. Some embodiments use light pens and/or other input devices in conjunction with, or instead of, mouse 230 or keyboard 220. Nor is the invention limited to any particular database or application. In some embodiments, screen 180 is composed of two or more separate screens. Server 210 is linked with an operating system in some embodiments, and is a separately linked program in other embodiments. In some embodiments, the user can display more than one HTML form. The user drags and drops HTML fields from HTML forms into window 164. The invention is not limited to using a drag & drop method, or any other method, to associate either application GUI objects or database objects with fields displayed by the link manager. In some embodiments, the invention uses function call interface, remote procedure call interface, or some other communication method instead of, or in conjunction with, the drag-and-drop method. The windows of FIGS. 6–9, 11, 12, 19A, 19B include in some embodiments additional information not shown in the figures, and/or the windows omit some information shown. In some embodiments, multiple windows are used in place of a single window, or on the contrary a number of windows are combined in a single window. The invention is not limited to any particular format or contents of mapping records, self-describing records, or any other data structures. In some embodiments, the link and execution managers are used when it is desired to change the application/database interface without rebuilding the application, even where an existing interface does not use the link and execution managers. For example, the link and execution managers are used to change the mapping between a PowerBuilder application and a database without rebuilding the application. One or more mapping records are omitted in some embodiments. Other embodiments and variations are within the scope of the invention as defined by the following claims.

APPENDIX A

MAPPING FILE

```
/* MAPPING FROM HTML TO DATABASE */
 1. {
 2.   "demo_html_to_db" {
 3.     "Class" "MapPackage";
 4.     "mappingDir" "BOTH_DIR";
 5.     "selfDescRecordName" "demo_html_to_db_sd";
 6.     "HTMLMapRecordName" "demo_html_to_db_ht";
 7.     "SqlMapRecordName" "demo_html_to_db_db";
 8.   }
/* Self-describing record */
 9.   "demo_html_to_db_sd" {
10.     "Class" "SelfDescRecord";
11.     "COMPONENTS" {
12.       "name" {
13.         "type" "String";
14.         "length" "512";
15.       }
16.     }
17.   }
/* Mapping record: from HTML to self-describing
objects */
18.   "demo_html_to_db_ht" {
19.     "Class" "MapRecord";
20.     "selfDescRecordName" "demo_html_to_db_sd";
21.     "HTMLFormName" "demo";
22.     "COMPONENTS" {
23.       "name" {
24.         "Class" "MapHTML";
25.         "selfDescFieldName" "name";
26.         "pairName" "name" ;
```

APPENDIX A-continued

MAPPING FILE

```
27.         "startLocation" "-1";
28.         "length" "0";
29.       }
30.     }
31.   }
/* Mapping record: from self-describing objects to
database */
32.   "demo_html_to_db_db" {
33.     "Class" "MapRecord";
34.     "selfDescRecordName" "demo_html_to_db_sd";
35.     "dbName" "stores6@learn_online";
36.     "sqlCmd" "select customer.lname, customer.phone
              from customer"; " ";
37.     "dbprocName"
38.     "COMPONENTS" {
39.       "name" {
40.         "Class" "MapSql"
41.         "selfDescFieldName" "name";
42.         "startLocation" "-1";
43.         "length" "0";
44.         "type" "String";
45.         "dbFieldName" " ";
46.         "logicOpName" "none";
47.         "arg1Name" "customer.lname";
48.         "compareOpName" "LIKE";
49.         "whereName" "where";
50.       }
51.     }
52.   }
/* MAPPING FROM DATABASE TO HTML */
53.   "demo_db_to_html" {
54.     "Class" "MapPackage";
55.     "mappingDir" "BOTH_DIR";
56.     "selfDescRecordName" "demo_db_to_html_sd";
57.     "ToHtmlMapRecordName" "demo_db_to_html_ht";
58.   }
/* Self-describing record */
59.   "demo_db_to_html_sd" {
60.     "Class" "SelfDescRecord";
61.     "COMPONENTS" {
62.       "lname" {
63.         "type" "String";
64.         "length" "0";
65.       }
66.       "phone" {
67.         "type" "String";
68.         "length" "0";
69.       }
70.     }
71.   }
/* Mapping record: from self-describing objects to
HTML */
72.   "demo_db_to_html_ht" {
73.     "Class" "MapRecord";
74.     "selfDescRecordName" "demo_db_to_html_sd";
75.     "htmlFileName" "/opt/www/doc/demo.html";
76.     "COMPONENTS" {
77.       "lname" {
78.         "Class" "MapToHtml";
79.         "selfDescFieldName" "lname";
80.         "startLocation" "-1";
81.         "length" "15";
82.         "htmlFieldName" "name";
83.       }
84.       "phone" {
85.         "Class" "MapToHtml";
86.         "selfDescFieldName" "phone";
87.         "startLocation" "-1";
88.         "length" "18";
89.         "htmlFieldName" "phone";
90.       }
91.     }
92.   }
93. }
```

I claim:

1. A method for creating a mapping between a database and a graphical user interface (GUI) of a computer application, the method comprising:

executing the application in a computer system so that the application displays one or more GUI objects;

for each of one or more of the displayed GUI objects, instructing the computer system to associate a parameter of the GUI object with a corresponding input field of a request to be provided to the database to indicate that a value of the parameter is to be inserted in the input field when the request is to be provided from the application to the database; and for each of one or more GUI objects, recording by the computer system, in a computer storage, a mapping between a parameter of the GUI object and the corresponding input field of the database request.

2. The method of claim 1 wherein the instructing process comprises:

displaying a representation of an input field of a database request;

pointing to a GUI object OBJ1 with a pointer device; and dragging, with the pointer device, the object OBJ1 to the representation of the input field.

3. The method of claim 1 wherein the database request is a query.

4. The method of claim 1 wherein association of a parameter of the GUI object with an input field of the request to the database, and the recording process, are performed by a computer program executed in the computer system, and wherein the computer program comprises information on formats of requests that can be generated by the application for a database and on formats of responses accepted by the application in response to the requests, so that the computer program is able to perform the association and the recording process for any application having predetermined formats of requests generated for a database and of responses accepted.

5. The method of claim 1 wherein at least one GUI object is an HTML object.

6. The method of claim 1 wherein the application comprises an HTML browser.

7. The method of claim 1 wherein the database comprises a relational database.

8. The method of claim 1 wherein the database comprises an object oriented database.

9. The method of claim 1 wherein at least one GUI object is displayed by an X-windows server.

10. The method of claim 1 wherein the instructing and the recording are performed for each of a plurality of the displayed GUI objects.

11. The method of claim 1 further comprising:

for each of one or more of the displayed GUI objects, instructing the computer system to associate a parameter of the GUI object with a corresponding output field of a response to be generated by the database, to indicate that a value in the output field is to be provided to the application as a value of the parameter; and for each of one or more GUI objects, recording by the computer system, in a computer storage, a mapping between a parameter of the GUI object and the corresponding output field of the database response.

12. The method of claim 3 wherein the query is SQL query.

13. A method for creating a mapping between a database and a graphical user interface (GUI) of a computer application, the method comprising:

executing the application in a computer system so that the application displays one or more GUI objects;

for each of one or more of the displayed GUI objects, instructing the computer system to associate a parameter of the GUI object with a corresponding output field of a response to be generated by the database, to indicate that a value in the output field is to be provided to the application as a value of the parameter; and for each of one or more GUI objects, recording by the computer system, in a computer storage, a mapping between a parameter of the GUI object and the corresponding output field of the database response.

14. The method of claim 13 wherein the instructing process comprises:

displaying a representation of an output field of the database response;

pointing to a GUI object with a pointer device; and dragging, with the pointer device, the GUI object to the representation of the output field.

15. The method of claim 13 wherein association of a parameter of the GUI object with an output field of the database response, and the recording process, are performed by a computer program executed in the computer system, and wherein the computer program comprises information on formats of requests that can be generated by the application for a database and formats of responses accepted by the application in response to the requests, so that the computer program is able to perform the association and the recording process for any application having predetermined formats of requests generated for a database and of responses accepted.

16. The method of claim 13 wherein at least one GUI object is an HTML object.

17. The method of claim 13 wherein the application comprises an HTML browser.

18. The method of claim 13 wherein the database comprises a relational database.

19. The method of claim 13 wherein the database comprises an object oriented database.

20. The method of claim 13 wherein at least one GUI object is displayed by an X-windows server.

21. The method of claim 13 wherein the instructing and the recording are performed for each of a plurality of the displayed GUI objects.

22. A computer-implemented structure for creating a mapping between a database and a graphical user interface (GUI) of a computer application, the structure comprising:

means for receiving from the computer application a parameter of a GUI object;

means for receiving information about an input field of a request to be provided to the database; and means for recording in a computer storage a mapping between the parameter and the input field to indicate that a value of the parameter is to be inserted in the input field when the request is to be provided to the database.

23. The computer-implemented structure of claim 22 wherein at least one GUI object is an HTML object.

24. The computer-implemented structure of claim 22 wherein the application comprises an HTML browser.

25. The computer-implemented structure of claim 22 wherein the database comprises a relational database.

26. The computer-implemented structure of claim 22 wherein the database comprises an object oriented database.

27. The computer-implemented structure of claim 22 wherein the structure comprises (1) a computer system comprising the computer storage and (2) a program loaded into the computer system, the computer system and the program comprising each of said means.

28. The computer-implemented structure of claim 22 wherein the structure is a computer readable medium and wherein each means comprises one or more computer instructions, computer readable data, or a combination of one or more instructions and data.

29. A computer-implemented structure for creating a mapping between a database and a graphical user interface (GUI) of a computer application, the structure comprising:

means for identifying an output field of a response to be generated by the database;

means for receiving from the application a parameter of a GUI object; and means for recording in a computer storage a mapping between the output field and the parameter to indicate that a value in the output field is to be provided to the application as a value of the parameter.

30. The computer-implemented structure of claim 29 wherein at least one GUI object is an HTML object.

31. The computer-implemented structure of claim 29 wherein the application comprises an HTML browser.

32. The computer-implemented structure of claim 29 wherein the database comprises a relational database.

33. The computer-implemented structure of claim 29 wherein the database comprises an object oriented database.

34. The computer-implemented structure of claim 29 wherein the structure comprises (1) a computer system comprising the computer storage and (2) a program loaded into the computer system, the computer system and the program comprising each of said means.

35. The computer-implemented structure of claim 29 wherein the structure is a computer readable medium and wherein each means comprises one or more computer instructions, computer readable data, or a combination of one or more instructions and data.

36. A method for providing a computer interface between a computer application and a computer database, the method comprising:

receiving from the application, by a computer program being executed in a computer system, a request R1 for the database, the request R1 comprising one or more values each of which is a value of a parameter of a graphical user interface (GUI) of the application;

creating in the computer system, by the computer program, a database request R2 corresponding to the request R1 and having a format suitable for sending the request R2 to the database, the request R2 having one or more input fields each of which has a value corresponding to a parameter value in the request R1; and sending, by the computer program, the request R2 to the computer database, wherein the computer program comprises information on formats of requests that can be generated by the application for a database and formats of responses accepted by the application in response to the requests to a database, so that the computer program is able to perform the recited processes for any computer application having predetermined formats of requests that can be generated by the application for a database and of responses accepted, wherein the creating process comprises:

reading, by the computer program, first data defining a format of the request R2 and also defining a mapping between (1) one or more parameters of the application GUI and (2) one or more corresponding input fields of the request R2 such that an input field is mapped into a parameter whose value is to be provided in the input field; and creating the request R2 so that the request R2 has the format defined by the first data and so that one or more input fields of the request R2 have values corresponding to the request R1 values of the corresponding parameters;

wherein the first data comprise one or more self-describing object fields each of which defines a format of a computer value, and wherein the first data define:

for each of one or more parameters whose values are present in the request R1, a mapping from the parameter to a corresponding self-describing object field; and for each self-describing object field corresponding to a parameter a mapping from the self-describing object field to a request R2 input field corresponding to the same parameter.

37. The method of claim 36 wherein at least one of the parameters is a name of an object of the application GUI.

38. The method of claim 36 wherein at least one of the parameters is a name of an attribute of an object of the application GUI.

39. The method of claim 36 wherein the first data contain no information about the application except information (1) on objects of the application GUI, (2) on formats of requests that can be generated by the application for a database, and (3) on formats of requests that the database can accept.

40. The method of claim 36 wherein the request R1 is received over a hypertext transfer protocol (HTTP).

41. The method of claim 36 wherein the application generates the request R1 using the PDF interface rules.

42. The method of claim 36 wherein the database comprises a relational database.

43. The method of claim 36 wherein the database comprises an object oriented database.

44. A method for providing a computer interface between a computer application and a computer database, the method comprising:

receiving from the database, by a computer program being executed in a computer system, a response R1 to a request, the response R1 including one or more values of database objects;

creating in the computer system, by the computer program, a response R2 corresponding to the response R1 and having a format suitable for sending the response R2 to the application, the response R2 having one or more output fields each of which is to have a value of a parameter of a graphical user interface (GUI) of the application, and providing, in each of one or more of the output fields, a value corresponding to a database object value from the response R1; and sending, by the computer program, the response R2 to the application, wherein the computer program comprises information on formats of requests that can be generated by the application to a database and formats of responses accepted by the application in response to the requests to a database, so that the computer program is able to perform the recited processes for any application having predetermined formats of requests that can be generated by the application for a database and of responses accepted, wherein the creating process comprises:

reading, by the computer program, first data defining a format of the response R2 and also defining a mapping between (1) one or more database objects and (2) one or more corresponding output fields of the response R2; and creating the response R2 so that the response R2 has the format defined by the first data and so that one or more output fields of the response R2 have values corresponding to the response R1 values of the corresponding database objects;

wherein the first data comprise one or more self-describing object fields each of which defines a format of a computer value, and wherein the first data define:

for each of one or more data objects whose values are present in the response R1, a mapping from the database object to a corresponding self-describing object field; and for each self-describing object field corresponding to a database object, a mapping from the self-describing object field to a response R2 output field corresponding to the same database object.

45. The method of claim 44 wherein at least one of the parameters is a name of an object of the application GUI.

46. The method of claim 44 wherein at least one of the parameters is a name of an attribute of an object of the application GUI.

47. The method of claim 44 wherein the first data contain no information about the application except information (1) on objects of the application GUI, (2) on formats of requests that can be generated by the application for a database, and (3) on formats of requests that the database can accept.

48. The method of claim 44 wherein the response R2 is sent to the application over an HTTP protocol.

49. The method of claim 44 wherein the application receives the response R2 according to the PDF interface rules.

50. The method of claim 44 wherein the database comprises a relational database.

51. The method of claim 44 wherein the database comprises an object oriented database.

52. A computer-implemented structure for providing a computer interface between a computer application and a computer database, the structure comprising:

means for receiving from the application, by a computer program being executed in a computer system, a request R1 for the database, the request R1 comprising one or more values each of which is a value of a parameter of a graphical user interface (GUI) of the application;

means for creating in the computer system, by the computer program, a database request R2 corresponding to the request R1 and having a format suitable for sending the request R2 to the database, the request R2 having one or more input fields each of which has a value corresponding to a parameter value in the request R1; and means for sending, by the computer program, the request R2 to the computer database, wherein the computer program comprises information on formats of requests that can be generated by the application for a database and formats of responses accepted by the application in response to the requests to a database, so that the computer program is able to perform the recited processes for any computer application having predetermined formats of requests that can be generated by the application for a database and of responses accepted, wherein the means for creating comprises:

means for reading by the computer program, first data defining a format of the request R2 and also defining a mapping between (1) one or more parameters of the application GUI and (2) one or more corresponding input fields of the request R2 such that an input field is mapped into a parameter whose value is to be provided in the input fields; and means for creating the request R2 so that the request R2 has the format defined by the first data and so that one or more input fields of the request R2 have values corresponding to the request R1 values of the corresponding parameters;

wherein the first data comprise one or more self-describing object fields each of which defines a format of a computer value; and wherein the first data define:

for each of one or more parameters whose values are present in the request R1, a mapping from the parameter to the corresponding self-describing object field; and for each self-describing object field correspond to a parameter, a mapping from the self-describing object field to the request R2 input field corresponding to the same parameter.

53. The computer-implemented structure of claim 52 wherein the structure comprises a computer system and a program loaded into the computer system, the computer system and the program comprising each of said means.

54. The computer-implemented structure of claim 52 wherein the structure is a computer readable medium and wherein each means comprises one or more computer instructions, computer readable data, or a combination of one or more instructions and data.

55. The computer-implemented structure of claim 52 wherein the means for receiving is to receive the request R1 over an HTTP protocol.

56. The computer-implemented structure of claim 52 wherein the request R1 conforms to the PDF interface rules.

57. The computer-implemented structure of claim 52 wherein the database comprises a relational database.

58. The computer-implemented structure of claim 52 wherein the database comprises an object oriented database.

59. A computer-implemented structure for providing a computer interface between a computer application and a computer database, the structure comprising:

means for receiving from the database, by a computer program being executed in a computer system, a response R1 to a request, the response R1 including one or more values of database objects;

means for creating in the computer system, by the computer program, a response R2 corresponding to the response R1 and having a format suitable for sending the response R2 to the application, the response R2 having one or more output fields each of which is to have a value of a parameter of a graphical user interface (GUI) of the application, and for providing, in each of one or more of the output fields, a value corresponding to a database object value from the response R1; and means for sending, by the computer program, the response R2 to the application, wherein the computer program comprises information on formats of requests that can be generated by the application to a database and formats of responses accepted by the application in response to the requests to a database, so that the computer program is able to perform the recited processes for any application having predetermined formats of requests that can be generated by the application for a database and of responses accepted, wherein the means for creating comprises:

means for reading, by the computer program, first data defining a format of the response R2 and also defining a mapping between (1) one or more database objects and (2) one or more corresponding output fields of the response R2; and means for creating the response R2 so that the response R2 has the format defined by the first data and so that one or more output fields of the response R2 have values corresponding to the response R1 values of the corresponding database objects;

wherein the first data comprising one or more self-describing object fields each of which defines a format of a computer value; and wherein the first data define:

for each one or more data objects whose values are present in the response R1, a mapping from the database object to a corresponding self-describing object field; and for each self-describing object field corresponding to a database object, a mapping from the self-describing object field to response R2 output field corresponding to the same database object.

60. The computer-implemented structure of claim 59 wherein the structure comprises a computer system and a program loaded into the computer system, the computer system and the program comprising each of said means.

61. The computer-implemented structure of claim 59 wherein the structure is a computer readable medium and wherein each means comprises one or more computer instructions, computer readable data, or a combination of one or more instructions and data.

62. The computer-implemented structure of claim 59 wherein the means for sending is to send the response R2 over HTTP protocol.

63. The computer-implemented structure of claim 59 wherein the response R2 conforms to the PDF interface rules.

64. The computer-implemented structure of claim 59 wherein the database comprises a relational database.

65. The computer-implemented structure of claim 59 wherein the database comprises an object oriented database.

* * * * *